United States Patent
Maeda

(10) Patent No.: US 6,690,480 B2
(45) Date of Patent: Feb. 10, 2004

(54) INTERNET FACSIMILE APPARATUS AND METHOD OF CONTROLLING INTERNET FACSIMILE COMMUNICATION USING THE APPARATUS

(75) Inventor: Toru Maeda, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/258,196

(22) Filed: Feb. 26, 1999

(65) Prior Publication Data

US 2003/0107776 A1 Jun. 12, 2003

(30) Foreign Application Priority Data

Feb. 27, 1998 (JP) .......................................... 10-047421
Feb. 27, 1998 (JP) .......................................... 10-047422
Feb. 27, 1998 (JP) .......................................... 10-047423

(51) Int. Cl.$^7$ ............................. G06F 15/16; H04N 1/32
(52) U.S. Cl. ..................... 358/1.15; 358/402; 358/434; 379/100.01; 709/206
(58) Field of Search ............................... 358/1.15, 442, 358/444, 434, 400, 402; 379/100.01; 709/206

(56) References Cited

U.S. PATENT DOCUMENTS 5,381,527 A * 1/1995 Inniss et al. ................. 709/239
6,374,291 B1 * 4/2002 Ishibashi et al. ............ 709/206

FOREIGN PATENT DOCUMENTS

| EP | 0 283 295 | 9/1988 |
| EP | 0 615 377 A2 | 9/1994 |
| JP | 361238137 A | * 10/1986 |
| JP | 403112261 A | * 5/1991 |
| JP | 404180343 A | * 6/1992 |
| WO | WO 97/18665 | 5/1997 |

OTHER PUBLICATIONS

Patent Abstracts of Japan, vol. 1996, No. 02, Feb. 29, 1996 (JP 07–288634; Oct. 31, 1995).
Patent Abstracts of Japan, vol. 1996, No. 04, Apr. 30, 1996 (JP 07–336462; Dec. 22, 1995).
Patent Abstracts of Japan, vol. 1997, No. 10, Oct. 31, 1997 (JP 09–149189; Jun. 6, 1997).
Patent Abstracts of Japan, vol. 1996, No. 02, Feb. 29, 1996 (JP 07–288557; Oct. 31, 1995).

* cited by examiner

Primary Examiner—Edward Coles
Assistant Examiner—Joseph R. Pokrzywa
(74) Attorney, Agent, or Firm—Fitzpatrick, Cella, Harper & Scinto

(57) ABSTRACT

Disclosed is an Internet FAX apparatus which, after receiving an Internet address from a certain destination, can communicate with the same destination in later transmission or during communication by connecting to a LAN and switching to an Internet FAX mode requiring no communication charge. An Internet facsimile apparatus on the receiving side transmits its Internet facsimile function and Internet address on an NSF signal in a standard protocol of G3 facsimile transmission and/or transmits its telephone number, Internet facsimile function, and Internet address on TSI and NSS signals in the standard protocol of G3 facsimile communication. The Internet facsimile apparatus registers an Internet facsimile function and Internet address of a partner apparatus as destination data. The Internet facsimile apparatus communicates with the partner apparatus by using the Internet address in the destination data in later transmission or by disconnecting ordinary facsimile mode communication and switching to the Internet FAX mode.

10 Claims, 15 Drawing Sheets

FIG. 2

FIF FORMAT OF NSF

| 1ST OCTET | 2ND OCTET | 3RD OCTET | 4TH OCTET | 5TH OCTET | ...... | 25TH OCTET |
|---|---|---|---|---|---|---|
| COUNTRY IDENTIFICATION CODE | | MAKER CODE | IFAX FUNCTION | INTERNET ADDRESS | | |
| 0000000000000000 | | 10001000 | 00000001 | ifax@can.co.jp | | |

FIG. 3

FORMAT OF DESTINATION TABLE

| ONE-TOUCH NUMBER | G3 FAX FUNCTION | TELEPHONE NUMBER | INTERNET FAX FUNCTION | INTERNET ADDRESS | ABBREVIATION OF DESTINATION |
|---|---|---|---|---|---|
| 01 | PRESENT | 012-345-6789 | NOT PRESENT | | CANO G3FAX |
| 02 | NOT PRESENT | | PRESENT | ifax@can.co.jp | CANO IFAX |
| 03 | PRESENT | 098-765-4321 | PRESENT | ifax@can.com | CANO G3/IFAX |
| 04 | | | | | |
| 05 | | | | | |
| 06 | | | | | |
| 07 | | | | | |

FIG. 9

FIF FORMAT OF NSS

| 1ST OCTET | 2ND OCTET | 3RD OCTET | 4TH OCTET | 5TH OCTET | ......  | 25TH OCTET |
|---|---|---|---|---|---|---|
| COUNTRY IDENTIFICATION CODE | | MAKER CODE | IFAX SWITCHING | INTERNET ADDRESS | | |
| 0000000000000000 | | 10001000 | 00000001 | ifax@can.co.jp | | |

INTERNET FACSIMILE APPARATUS AND METHOD OF CONTROLLING INTERNET FACSIMILE COMMUNICATION USING THE APPARATUS

BACKGROUND OF THE INVENTION

1. Field of the Invention

The present invention relates to an Internet facsimile apparatus for performing transmission and reception by a facsimile via a telephone network and also transmitting and receiving an image by Internet facsimile via the Internet.

2. Description of the Related Art

Recently, it has become possible to perform transmission and reception by a G3 facsimile via a telephone network and also transmit and receive a message with an image file by using an Internet facsimile (to be also referred to as Internet FAX hereinafter) system requiring no communication charge by connecting to a LAN.

Unfortunately, the conventional system has its limits, e.g., (1) whether a communication partner has an Internet FAX function cannot be known during G3 facsimile communication, and (2) the Internet address of a communication partner cannot be known during G3 facsimile communication. For example, even when a communication partner has the Internet FAX function, the system cannot switch from a G3 facsimile mode to an Internet FAX mode requiring no communication charge by connecting to a LAN. Also, the modes can be switched only when an operator designates mode switching and sets an Internet address.

SUMMARY OF THE INVENTION

The present invention has been made to solve the above conventional problems, and has as its object to provide an Internet FAX apparatus having a G3 facsimile function and an Internet FAX function and capable of (1) detecting in a G3 facsimile mode whether a communication partner has the Internet FAX function and (2) exchanging Internet addresses with a communication partner in the G3 facsimile mode and, after receiving the Internet address, communicating with the same destination by connecting to a LAN and switching to an Internet FAX mode requiring no communication charge in the middle of communication or in later transmission to the destination.

It is another object of the present invention to provide an Internet FAX apparatus having a G3 facsimile function and an Internet FAX function and capable of receiving an Internet address in a G3 facsimile mode and managing the received Internet address.

To achieve the above objects, an Internet facsimile apparatus of the present invention is characterized by comprising destination data storage means for storing destination data containing at least presence/absence of an Internet facsimile function, and Internet address of each transmission destination, first transmitting/receiving means for transmitting and receiving an image by an Internet facsimile transmitting/receiving function, second transmitting/receiving means for transmitting and receiving an image by an ordinary facsimile transmitting/receiving function, Internet function informing means for transmitting an Internet facsimile function and Internet address of the Internet facsimile apparatus while the second transmitting/receiving means is performing ordinary facsimile reception, and Internet function detecting means for detecting and registering an Internet facsimile function and Internet address of a partner apparatus in corresponding destination data in the destination data storage means while the second transmitting/receiving means is performing ordinary facsimile transmission, wherein when transmission is to be performed for the partner apparatus after the Internet facsimile function and Internet address of the partner apparatus are registered in the corresponding destination data in the destination data storage means, the first transmitting/receiving means communicates with the partner apparatus by using the Internet address in the destination data.

An Internet facsimile apparatus of the present invention is characterized by comprising destination data storage means for storing destination data containing at least presence/absence of an Internet facsimile function, and Internet address of each transmission destination, first transmitting/receiving means for transmitting and receiving an image by an Internet facsimile transmitting/receiving function, second transmitting/receiving means for transmitting and receiving an image by an ordinary facsimile transmitting/receiving function, Internet function detecting means for detecting and registering an Internet facsimile function and Internet address of a partner apparatus in corresponding destination data in the destination data storage means while the second transmitting/receiving means is performing ordinary facsimile transmission, wherein when transmission is to be performed for the partner apparatus after the Internet facsimile function and Internet address of the partner apparatus are registered in the corresponding destination data in the destination data storage means, the first transmitting/receiving means communicates with the partner apparatus by using the Internet address in the destination data.

An Internet facsimile apparatus of the present invention is characterized by comprising first transmitting/receiving means for transmitting and receiving an image by an Internet facsimile transmitting/receiving function, second transmitting/receiving means for transmitting and receiving an image by an ordinary facsimile transmitting/receiving function, and Internet function informing means for transmitting an Internet facsimile function and Internet address of the Internet facsimile apparatus while the second transmitting/receiving means is performing ordinary facsimile reception.

The Internet function informing means or the Internet function detecting means transmits or receives the Internet facsimile function and Internet address by using a predetermined signal in a standard protocol of ordinary facsimile transmission by the second transmitting/receiving means. The ordinary facsimile is a G3 facsimile, and the Internet function informing means or the Internet function detecting means transmits the Internet facsimile function and Internet address by using an NSF signal in the standard protocol. The destination data contains at least presence/absence of an Internet facsimile function and an Internet address of a corresponding one-touch dial. The first transmitting/receiving means comprises means for transmitting e-mail, means for attaching an image file to e-mail, means for receiving e-mail, means for extracting an attached file from e-mail, means for checking whether the attached file is an image file, and means for performing Internet facsimile reception if the attached file is found to be an image file. The Internet address is an e-mail address.

An Internet address informing method using an Internet facsimile apparatus of the present invention is an Internet address informing method using an Internet facsimile apparatus for transmitting and receiving an image by an Internet facsimile transmitting/receiving function and an ordinary facsimile transmitting/receiving function, characterized in that an Internet facsimile apparatus on a receiving side transmits an Internet facsimile function and Internet address thereof on a predetermined signal in a standard protocol of ordinary facsimile communication, and an Internet facsimile apparatus on a transmitting side detects and registers the Internet facsimile function and Internet address of the Internet facsimile apparatus on the receiving side, carried on the predetermined signal in the standard protocol of ordinary facsimile communication, as destination data, and, when transmission is to be performed for the Internet facsimile apparatus on the receiving side thereafter, communicates with the Internet facsimile apparatus on the receiving side by using the Internet address in the destination data.

The ordinary facsimile communication is G3 facsimile communication, and the predetermined signal is an NSF signal and carries the Internet facsimile function and Internet address of the Internet facsimile apparatus on the receiving side. The Internet facsimile function is stored in a fourth octet of the NSF signal and transmitted, and the Internet address is stored in fifth to twenty-fifth octets of the NSF signal and transmitted. The fourth octet of the NSF signal is not 0 when the Internet facsimile function is present, and is 0 when the Internet facsimile function is not present.

A storage medium of the present invention is a storage medium for storing, in a computer readable form, a control program containing an Internet address informing program in an Internet facsimile apparatus for transmitting and receiving an image by an Internet facsimile transmitting/receiving function and an ordinary facsimile transmitting/receiving function, characterized in that the informing program comprises a transmission module for transmitting an Internet facsimile function and Internet address of the Internet facsimile apparatus on a predetermined signal in a standard protocol during ordinary facsimile reception, a registration module for detecting and registering an Internet facsimile function and Internet address of a partner apparatus, carried on the predetermined signal in the standard protocol, as destination data during ordinary facsimile reception, and a communication module for communicating with the partner apparatus by using the Internet address in the destination data when transmission is to be performed for the partner apparatus after the registration. The storage medium further contains registered destination data.

To achieve the above objects, an Internet facsimile apparatus of the present invention is characterized by comprising destination data storage means for storing destination data containing at least a telephone number, presence/absence of an Internet facsimile function, and Internet address of each transmission destination, first transmitting/receiving means for transmitting and receiving an image by an Internet facsimile transmitting/receiving function, second transmitting/receiving means for transmitting and receiving an image by an ordinary facsimile transmitting/receiving function, first Internet function informing means for transmitting an Internet facsimile function, and Internet address of the Internet facsimile apparatus while the second transmitting/receiving means is performing ordinary facsimile transmission, and first Internet function detecting means for detecting and registering an Internet facsimile function, and Internet address of a partner apparatus in corresponding destination data in the destination data storage means while the second transmitting/receiving means is performing ordinary facsimile reception, wherein when transmission is to be performed for the partner apparatus after the Internet facsimile function and Internet address of the partner apparatus are registered in the corresponding destination data in the destination data storage means, the first transmitting/receiving means communicates with the partner apparatus by using the Internet address in the destination data.

The Internet facsimile apparatus is characterized by further comprising second Internet function informing means for transmitting the Internet facsimile function and Internet address of the Internet facsimile apparatus while the second transmitting/receiving means is performing ordinary facsimile reception, and second Internet function detecting means for detecting and registering an Internet facsimile function and Internet address of a partner apparatus in corresponding destination data in the destination data storage means while the second transmitting/receiving means is performing ordinary facsimile transmission.

An Internet facsimile apparatus of the present invention is characterized by comprising destination data storage means for storing destination data containing at least a telephone number, presence/absence of an Internet facsimile function, and Internet address of each transmission destination, first transmitting/receiving means for transmitting and receiving an image by an Internet facsimile transmitting/receiving function, second transmitting/receiving means for transmitting and receiving an image by an ordinary facsimile transmitting/receiving function, second Internet function detecting means for detecting and registering an Internet facsimile function and Internet address of a partner apparatus in corresponding destination data in the destination data storage means while the second transmitting/receiving means is performing ordinary facsimile transmission, and first Internet function informing means for transmitting an Internet facsimile function, and Internet address of the Internet facsimile apparatus while the second transmitting/receiving means is performing ordinary facsimile transmission, wherein when transmission is to be performed for the partner apparatus after the Internet facsimile function and Internet address of the partner apparatus are registered in the corresponding destination data in the destination data storage means, the first transmitting/receiving means communicates with the partner apparatus by using the Internet address in the destination data.

An Internet facsimile apparatus of the present invention is characterized by comprising destination data storage means for storing destination data containing at least a telephone number, presence/absence of an Internet facsimile function, and Internet address of each transmission destination, first transmitting/receiving means for transmitting and receiving an image by an Internet facsimile transmitting/receiving function, second transmitting/receiving means for transmitting and receiving an image by an ordinary facsimile transmitting/receiving function, and first Internet function detecting means for detecting and registering an Internet facsimile function, and Internet address of a partner apparatus in corresponding destination data in the destination data storage means while the second transmitting/receiving means is performing ordinary facsimile reception, wherein when transmission is to be performed for the partner apparatus after the Internet facsimile function and Internet address of the partner apparatus are registered in the corresponding destination data in the destination data storage means, the first transmitting/receiving means communicates with the partner apparatus by using the Internet address in the destination data.

The Internet facsimile apparatus is characterized by further comprising second Internet function informing means for transmitting an Internet facsimile function and Internet address of the Internet facsimile apparatus while the second transmitting/receiving means is performing ordinary facsimile reception.

The first Internet function detecting means retrieves destination data from the detected telephone number and registers the Internet facsimile function and Internet address in the retrieved destination data. The first Internet function informing means or the Internet function detecting means transmits or receives the telephone number, Internet facsimile function, and Internet address by using a predetermined signal in a standard protocol of ordinary facsimile transmission by the second transmitting/receiving means. The ordinary facsimile is a G3 facsimile, and the first Internet function informing means or the first Internet function detecting means transmits the Internet facsimile function and Internet address by using an NSS signal in the standard protocol. The Internet facsimile function is stored in a fourth octet of the NSS signal and transmitted, and the Internet address is stored in fifth to twenty-fifth octets of the NSS signal and transmitted. The fourth octet of the NSS signal is not 0 when the Internet facsimile function is present, and is 0 when the Internet facsimile function is not present. The ordinary facsimile is a G3 facsimile, and the first Internet function informing means or the first Internet function detecting means transmits the telephone number by using a TSI signal in the standard protocol. The first Internet function detecting means detects a telephone number from a telephone number information service signal from a switching unit. The ordinary facsimile is a G3 facsimile, and the second Internet function informing means or the second Internet function detecting means transmits the Internet facsimile function and Internet address by using an NSF signal in the standard protocol. The destination data contains at least presence/absence of an Internet facsimile function and an Internet address of a corresponding one-touch dial. The first transmitting/receiving means comprises means for transmitting e-mail, means for attaching an image file to e-mail, means for receiving e-mail, means for extracting an attached file from e-mail, means for checking whether the attached file is an image file, and means for performing Internet facsimile reception if the attached file is found to be an image file. The Internet address is an e-mail address.

An Internet address informing method using an Internet facsimile apparatus of the present invention is an Internet address informing method using an Internet facsimile apparatus for transmitting and receiving an image by an Internet facsimile transmitting/receiving function and an ordinary facsimile transmitting/receiving function, characterized in that an Internet facsimile apparatus on a transmitting side transmits an Internet facsimile function, and Internet address thereof on first and second signals in a standard protocol of ordinary facsimile communication, and an Internet facsimile apparatus on a receiving side detects and registers the telephone number, Internet facsimile function, and Internet address of the Internet facsimile apparatus on the transmitting side, carried on the first and second signals in the standard protocol of ordinary facsimile communication, as destination data, and, when transmission is to be performed for the Internet facsimile apparatus on the transmitting side thereafter, communicates with the Internet facsimile apparatus on the transmitting side by using the Internet address in the destination data.

The ordinary facsimile communication is G3 facsimile communication, the first signal is a TSI signal and carries the telephone number of the Internet facsimile apparatus on the transmitting side, and the second signal is an NSS signal and carries the Internet facsimile function and Internet address of the Internet facsimile apparatus on the transmitting side. The Internet facsimile apparatus on the receiving side transmits the Internet facsimile function and Internet address thereof on a third signal in the standard protocol of ordinary facsimile communication, and the Internet facsimile apparatus on the transmitting side detects and registers the Internet facsimile function and Internet address of the Internet facsimile apparatus on the receiving side, carried on the third signal in the standard protocol of ordinary facsimile communication, as destination data, and, when transmission is to be performed for the Internet facsimile apparatus on the receiving side thereafter, communicates with the Internet facsimile apparatus on the receiving side by using the Internet address in the destination data. The standard facsimile communication is G3 facsimile communication, and the third signal is an NSF signal and carries the Internet facsimile function and Internet address of the Internet facsimile apparatus on the receiving side. The Internet facsimile function is stored in a fourth octet of the NSS or NSF signal and transmitted, and the Internet address is stored in fifth to twenty-fifth octets of the NSS or NSF signal and transmitted. The fourth octet of the NSS or NSF signal is not 0 when the Internet facsimile function is present, and is 0 when the Internet facsimile function is not present.

A storage medium of the present invention is a storage medium for storing, in a computer readable form, a control program containing an Internet address informing program in an Internet facsimile apparatus for transmitting and receiving an image by an Internet facsimile transmitting/receiving function and an ordinary facsimile transmitting/receiving function, characterized in that the informing program comprises a first transmission module for transmitting an Internet facsimile function, and Internet address of the Internet facsimile apparatus on first and second signals in a standard protocol during ordinary facsimile reception, a first registration module for detecting and registering an Internet facsimile function, and Internet address of a partner apparatus, carried on the first and second signals in the standard protocol, as destination data during ordinary facsimile reception, and a communication module for communicating with the partner apparatus by using the Internet address in the destination data when transmission is to be performed for the partner apparatus after the registration.

The informing program further comprises a second transmission module for transmitting an Internet facsimile function and Internet address of the Internet facsimile apparatus on a third signal in the standard protocol during ordinary facsimile reception, and a second registration module for detecting and registering an Internet facsimile function and Internet address of a partner apparatus, carried on the third signal in the standard protocol, as destination data during ordinary facsimile transmission. The storage medium further contains registered destination data.

To achieve the above objects, an Internet facsimile apparatus of the present invention is characterized by comprising first transmitting/receiving means for transmitting and receiving an image by an Internet facsimile transmitting/receiving function, second transmitting/receiving means for transmitting and receiving an image by an ordinary facsimile transmitting/receiving function, determining means for determining whether a partner apparatus has an Internet facsimile function while the second transmitting/receiving means is performing ordinary facsimile transmission, and mode switching means for disconnecting ordinary facsimile mode communication and switching to an Internet facsimile mode if the partner apparatus is found to have the Internet facsimile function.

The determining means comprises means for determining whether the partner apparatus has the Internet facsimile function in accordance with a predetermined signal in a standard protocol of ordinary facsimile communication by the second transmitting/receiving means, and means for obtaining an Internet address of the partner apparatus from the predetermined signal. The ordinary facsimile is a G3 facsimile, and, when the Internet facsimile apparatus is a transmitter, the predetermined signal is an NSF signal in the standard protocol, information indicating whether the Internet facsimile function is present is stored in a fourth octet of the NSF signal and transmitted, and the Internet address is stored in fifth to twenty-fifth octets of the NSF signal and transmitted. The ordinary facsimile is a G3 facsimile, and, when the Internet facsimile apparatus is a receiver, the predetermined signal is an NSS signal in the standard protocol, information indicating whether the Internet facsimile function is present is stored in a fourth octet of the NSS signal and transmitted, and the Internet address is stored in fifth to twenty-fifth octets of the NSS signal and transmitted. The fourth octet of the NSF or NSS signal is not 0 when the Internet facsimile function is present, and is 0 when the Internet facsimile function is not present. When the Internet facsimile apparatus is a transmitter and the NSF signal indicates that a receiver has the Internet facsimile function, the mode switching means informs the receiver that the transmitter has the Internet facsimile function by using the NSS signal, waits for CFR, disconnects a line after sending DCN, and starts image transmission by an Internet facsimile. When the Internet facsimile apparatus is a receiver and the NSS signal indicates that a transmitter has the Internet facsimile function, the mode switching means sends CFR, disconnects a line after receiving DCN, and starts image transmission by an Internet facsimile.

The Internet facsimile apparatus further comprises destination data storage means for storing destination data containing at least presence/absence of an Internet facsimile function and an Internet address of each transmission destination, and first Internet address registering means for registering an Internet facsimile function and Internet address of a partner apparatus, detected from the NSF signal during the G3 facsimile transmission, in corresponding destination data in the destination data storage means, wherein when transmission is to be performed for the partner apparatus after the Internet facsimile function and Internet address of the partner apparatus are registered in the corresponding destination data in the destination data storage means, communication is performed by using the Internet address in the destination data. The Internet facsimile apparatus further comprises destination data storage means for storing destination data containing at least presence/absence of an Internet facsimile function and an Internet address of each transmission destination, and second Internet address registering means for registering an Internet facsimile function and Internet address of a partner apparatus, detected from the NSS signal during the G3 facsimile transmission, in corresponding destination data in the destination data storage means, wherein when transmission is to be performed for the partner apparatus after the Internet facsimile function and Internet address of the partner apparatus are registered in the corresponding destination data in the destination data storage means, communication is performed by using the Internet address in the destination data. The first transmitting/receiving means comprises means for transmitting e-mail, means for attaching an image file to e-mail, means for receiving e-mail, means for extracting an attached file from e-mail, means for checking whether the attached file is an image file, and means for performing Internet facsimile reception if the attached file is found to be an image file. The Internet address is an e-mail address.

An Internet facsimile communication control method using an Internet facsimile apparatus of the present invention is an Internet facsimile communication control method using an Internet facsimile apparatus for transmitting and receiving an image by an Internet facsimile transmitting/receiving function and an ordinary facsimile transmitting/receiving function, characterized in that an Internet facsimile apparatus on a receiving side transmits an Internet facsimile function and Internet address thereof on a first signal in a standard protocol of ordinary facsimile communication, an Internet facsimile apparatus on a transmitting side detects the Internet facsimile function and Internet address of the Internet facsimile apparatus on the receiving side, carried on the first signal in the standard protocol of ordinary facsimile communication, and transmits at least an Internet facsimile function thereof on a second signal in the standard protocol of ordinary facsimile communication, the Internet facsimile apparatus on the receiving side detects the Internet facsimile function of the Internet facsimile apparatus on the transmitting side, carried on the second signal in the standard protocol of ordinary facsimile communication, and requests the Internet facsimile apparatus on the transmitting side to disconnect a line, and the Internet facsimile apparatus on the transmitting side disconnects the line and transmits an image to the Internet facsimile apparatus on the receiving side by an Internet facsimile.

The ordinary facsimile communication is G3 facsimile communication, the first signal is an NSF signal, and the second signal is an NSS signal. The Internet facsimile function is stored in a fourth octet of the NSS or NSF signal and transmitted, and the Internet address is stored in fifth to twenty-fifth octets of the NSS or NSF signal and transmitted. The fourth octet of the NSS or NSF signal is not 0 when the Internet facsimile function is present, and is 0 when the Internet facsimile function is not present.

A storage medium of the present invention is a storage medium for storing a control program for Internet facsimile communication in a computer readable form in an Internet facsimile apparatus for transmitting and receiving an image by an Internet facsimile transmitting/receiving function and an ordinary facsimile transmitting/receiving function, characterized in that the control program comprises a determination module for determining during ordinary facsimile transmission whether a partner apparatus has an Internet facsimile function, and a mode switching module for disconnecting ordinary facsimile mode communication and switching to an Internet facsimile mode if the partner apparatus is found to have the Internet facsimile function. The storage medium further comprises a registration module for detecting and registering an Internet address of the partner apparatus if the partner apparatus is found to have the Internet facsimile function, and a communication module for communicating with the partner apparatus by using the Internet address in the destination data when transmission is to be performed for the partner apparatus after the registration. The storage medium further contains registered destination data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing the format of T.30 NSF in the present invention;

FIG. 3 is a view showing the format of destination data in the present invention;

FIG. 9 is a view showing the format of T.30 NSS in the second embodiment;

DETAILED DESCRIPTION OF THE PREFERRED EMBODIMENTS

Embodiments of the present invention will be described below with reference to the accompanying drawings.

<Arrangement of Internet FAX Apparatus of Embodiments>

Figure 1:
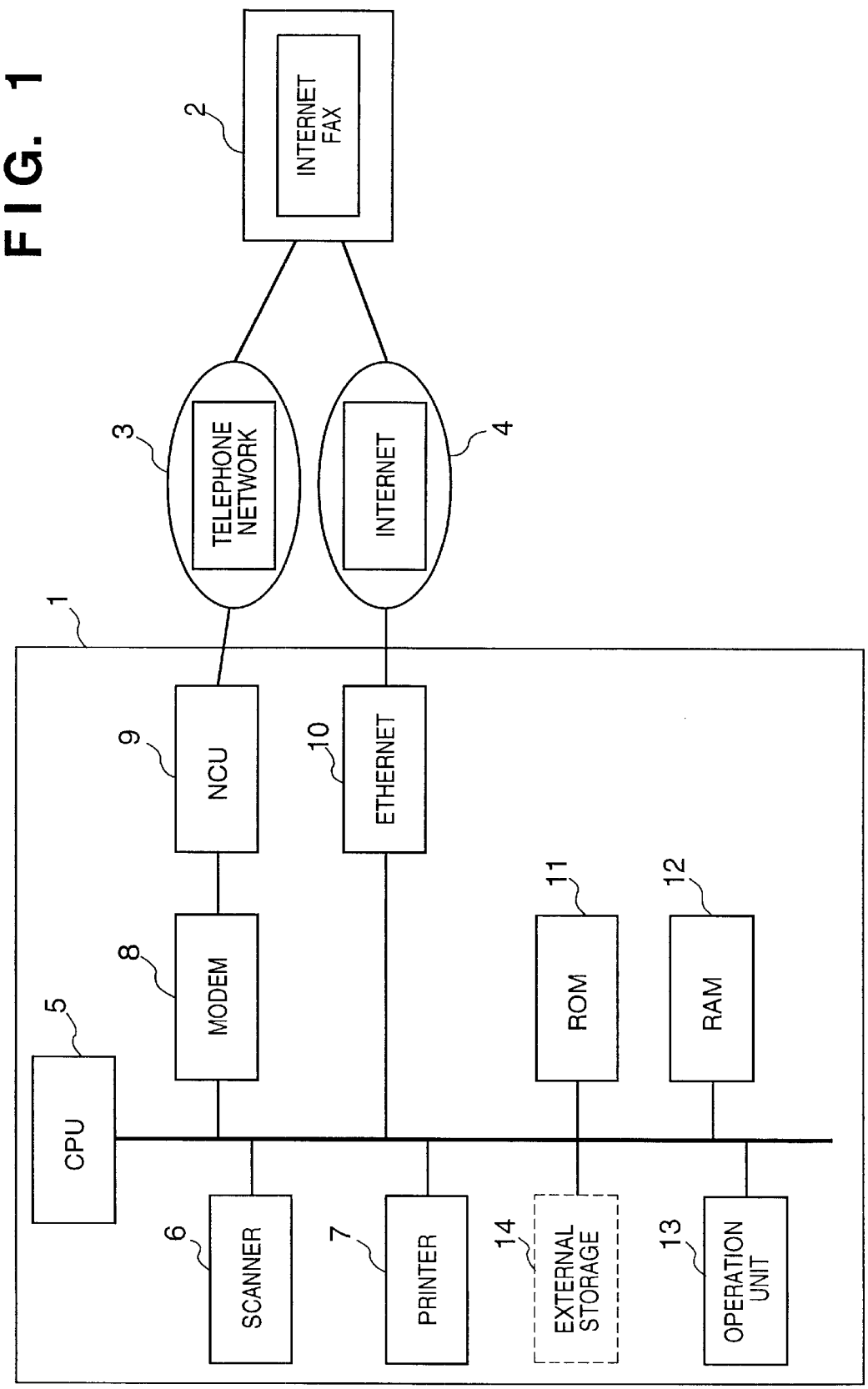
FIG. 1 is a block diagram showing an image communication network including an Internet FAX apparatus of the present invention.

FIG. 1 is a block diagram showing an image communication network including an Internet FAX apparatus of embodiments.

In FIG. 1, reference numeral 1 denotes an Internet FAX apparatus on the transmitting side for transmitting an image; and 2, an Internet FAX apparatus on the receiving side for receiving an image. This Internet FAX apparatus 2 has the same configuration as the Internet FAX apparatus 1 on the transmitting side. Reference numeral 3 denotes a telephone network for performing G3 FAX communication; and 4, the Internet for carrying e-mail.

The Internet FAX apparatuses 1 and 2 have the following components. Note that the internal structure of the Internet FAX apparatus 2 is not shown in FIG. 1 because the structure is the same as the transmitting side.

Reference numeral 5 denotes a CPU for controlling the Internet FAX apparatus; 6, a scanner for reading originals to be transmitted; 7, a printer for printing out received images; 8, a FAX modem for communicating in the G3 FAX mode; 9, an NCU for controlling the connection with a telephone line; 10, an Ethernet interface, for example, for connecting to the Internet; 11, a ROM storing software programs for control procedures shown in FIGS. 4 to 8 to be executed by the CPU 5; 12, a RAM for storing the work of the control software programs and destination data shown in FIGS. 3; 13, an operation unit including one-touch buttons for inputting destinations; and 14, an external storage such as a floppy disk or CD-ROM.

A case in which the Internet FAX apparatuses 1 and 2 operate as the transmission and receiving sides, respectively, will be described below with reference to FIG. 1.

The telephone network 3 is used to perform G3 facsimile communication. The Internet 4 is a network for communicating Internet e-mail. The CPU 5 controls the Internet FAX apparatus 1. The scanner 6 reads and converts originals into image data. The printer 7 prints out image data as images on printing sheets. The modem 8 modulates and demodulates G3 FAX protocol signals and image signals. The NCU 9 is connected to the telephone line to initiate calls to and receive calls from the line and interface analog signals. The Ethernet 10 is connected to the Internet 4 to exchange digital signals in the form of TCP/IP packets. The ROM 11 stores control programs and control data of the Internet FAX apparatus 1. The CPU 5 executes these control programs and data. The RAM 12 is used as a work area of the control programs of the Internet FAX apparatus 1. The RAM 12 also stores control data and destination data which the CPU 5 accesses. The operation unit 13 includes one-touch buttons for designating destinations in transmission. The external storage 14 is used to load or save control programs and/or data. The control software programs can also be loaded from the external storage 14 into the RAM 12 and executed by the CPU 5. The external storage 14 can also store the destination data shown in FIG. 3.

FIG. 3 shows the format of the destination data.

The RAM 12 stores the presence/absence of the G3 FAX function ("absence" includes unset), telephone number, presence/absence of the Internet FAX function ("absence" includes unset), Internet address, and abbreviation of the destination in the form of a table for each one-touch number. When a one-touch button is pressed on the operation unit 13, the CPU 5 can read out the corresponding one-touch number information.

The contents of the FIF format of a T.30 NSF signal transmitted from the Internet FAX apparatus on the receiving side will be described below with reference to FIG. 2.

The FIF format of NSF is composed of 25 octets. The first and second octets store a country identification code. The third octet stores a maker code. The fourth octet indicates the presence/absence of the Internet FAX function on the receiving side. 00000001 indicates that the Internet FAX function is present; 00000000 indicates that the function is not present. The fifth to twenty-fifth octets store the Internet address of the Internet FAX apparatus on the receiving side. That is, the Internet FAX apparatus on the receiving side sends an FIF of NSS signal to the transmitting side by storing 00000001 in the fourth octet and the Internet address in the fifth to twenty-fifth octets of the FIF of NSF. On the other hand, G3 and G4 FAX apparatuses send 00000000 because they do not use the fourth octet.

<Transmission/Reception by Internet FAX Apparatus of Embodiments>

A summary of transmission and reception of an image in the G3 facsimile mode performed in the above arrangement will be described below.

An operator sets an original on the scanner 6 of the Internet FAX apparatus 1 on the transmitting side and presses a one-touch button of the operation unit 13. Consequently, destination data is read out from the RAM 12 in accordance with the designated destination. If the G3 facsimile mode is designated, a telephone number is read out from the RAM 12, and the NCU 9 calls the Internet FAX apparatus 2 on the receiving side via the telephone network 3.

Also, the scanner 6 of the Internet FAX apparatus 1 reads an image, and the CPU 5 executes the control software programs to convert the image into image data.

When the line is connected, the Internet FAX apparatus 2 starts automatic reception in accordance with the standard G3 FAX protocol. That is, a protocol signal from the Internet FAX apparatus 1 is modulated by the modem 8 and transmitted to the Internet FAX apparatus 2 via the telephone network 3.

First, initial identification is performed in accordance with the T.30 protocol of ITU-T. When this initial identification is complete, the CPU 5 executes the control software programs to encode the image data and transmit the encoded data to the Internet FAX apparatus 2. In the Internet FAX apparatus 2, the received image data is transferred to the printer and printed out.

Upon receiving a confirmation signal from the Internet FAX apparatus 2, the Internet FAX apparatus 1 completes the G3 FAX mode.

Next, a summary of transmission and reception of an image file in the Internet FAX mode will be described below. In the embodiments, transmission of e-mail is taken as an example.

An operator sets an original on the scanner 6 of the Internet FAX apparatus 1 on the transmitting side and presses a one-touch button of the operation unit 13. Consequently, destination data is read out from the RAM 12 in accordance with the destination designated by the operation unit 13. If the Internet FAX mode is designated, an Internet address is read out from the RAM 12.

Also, the scanner 6 of the Internet FAX apparatus 1 reads an image, and the CPU 5 executes the control software programs to convert the image into image data. The CPU 5 further executes the control software programs to convert the image data into a TIFF file as an attached file of e-mail.

The Internet address of the Internet FAX apparatus 2 on the receiving side is set as the destination of the e-mail. By using an SMTP protocol for e-mail transmission, the e-mail containing the image data is transmitted from the Ethernet to the Internet FAX apparatus 2 via the Internet.

The Internet FAX apparatus 2 receives the e-mail in accordance with the standard SMTP protocol. The TIFF file as an attached file of the e-mail is detected and converted into the image data. This image data is transferred to the printer and printed out.

<Operation of Internet FAX Apparatus of First Embodiment>

As described above, the Internet FAX apparatus of the present invention can operate in the G3 facsimile mode and Internet FAX mode. The operation of this Internet FAX apparatus according to the first embodiment will be described below with reference to the T.30 FIF of NSF format shown in FIG. 2, the destination data format shown in FIG. 3, a flow chart of mode selection shown in FIG. 4, a flow chart of G3 transmission by the Internet FAX apparatus shown in FIG. 5, a flow chart of G3 reception by the Internet FAX apparatus shown in FIG. 6, a flow chart of Internet FAX transmission by the Internet FAX apparatus shown in FIG. 7, and a flow chart of Internet FAX reception by the Internet FAX apparatus shown in FIG. 8. Note that the Internet FAX apparatus of the first embodiment performs G3 FAX communication whenever the apparatus determines that the communication partner is not an Internet FAX apparatus.

A summary of the G3 transmission procedure of the Internet FAX apparatus according to the first embodiment will be described below. Since this apparatus basically operates in accordance with the standard T.30 protocol, only an additional operation of this embodiment will be described.

When receiving NSF from an apparatus on the receiving side, the Internet FAX apparatus of this embodiment checks the presence/absence of the Internet FAX function in the fourth octet of the NSF. If the Internet FAX function is present (00000001), the Internet FAX apparatus stores the Internet address indicated by the fifth and subsequent octets in the destination table.

When receiving CFR after transmitting NSS, the Internet FAX apparatus sends a training signal and subsequently a FAX message in accordance with the standard T.30 protocol.

After that, transmission to the apparatus on the receiving side is performed by Internet FAX transmission by using the Internet address received by the NSF.

A summary of the G3 reception procedure of the Internet FAX apparatus according to the first embodiment will be described below. This apparatus basically operates in accordance with the standard T.30 protocol, so only an additional operation of this embodiment will be described.

Since the Internet FAX apparatus on the receiving side has an Internet FAX function, the apparatus sets the fourth octet (00000001) of FIF of NSF when transmitting the FIF of NSF. The apparatus stores its Internet address in the fifth and subsequent octets.

After that, the apparatus performs ordinary G3 reception.

<Operation Flow Charts of Internet FAX Apparatus of First Embodiment>

Figure 4:
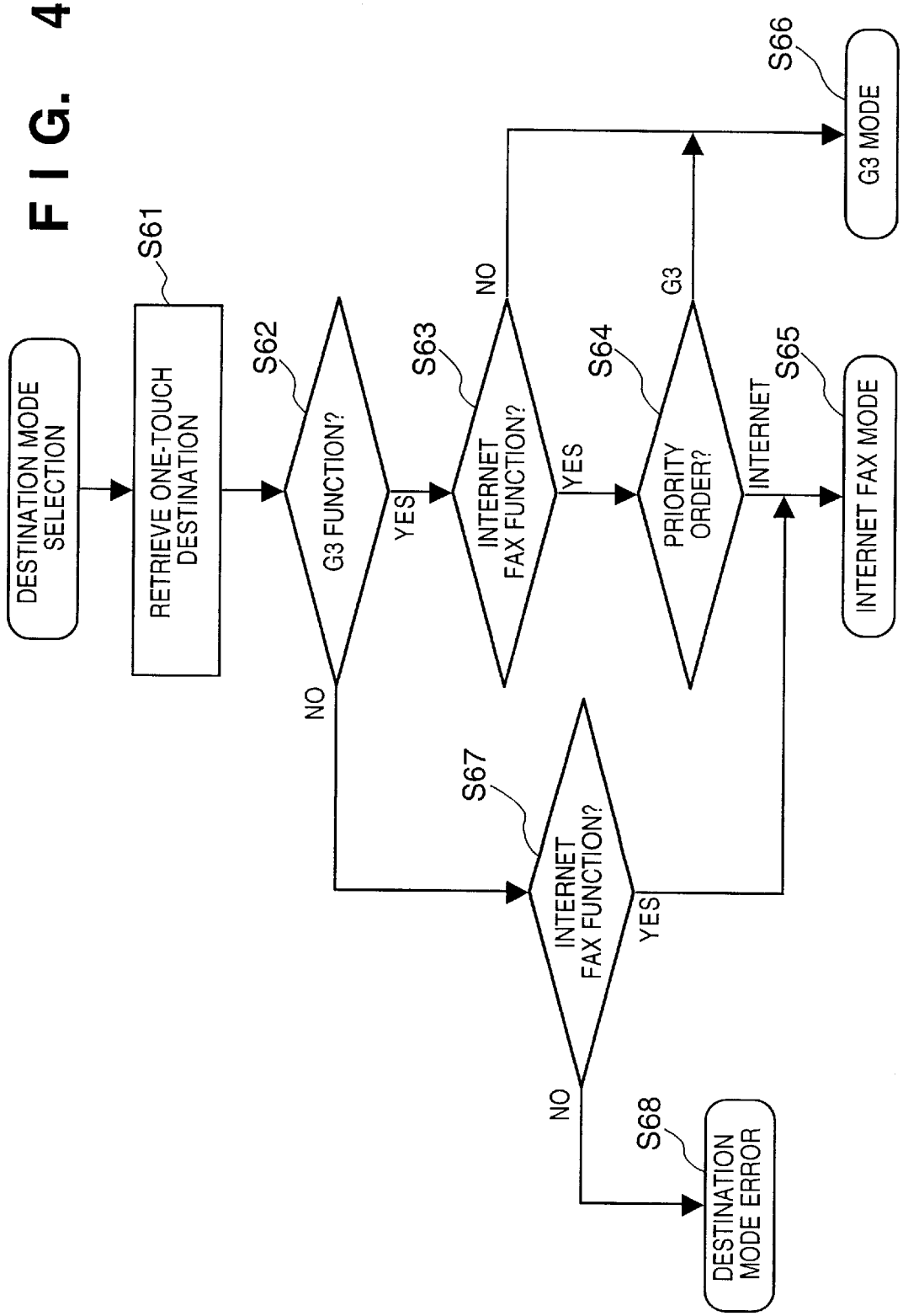
FIG. 4 is a flow chart showing mode selection by the Internet FAX apparatus of the present invention.

FIG. 4 is a flow chart showing mode selection by the Internet FAX apparatus of the first embodiment. A procedure of selecting the G3 facsimile mode and Internet FAX mode will be described below with reference to FIG. 4.

When an operator presses a one-touch button of the operation unit before transmission, the CPU 5 checks a destination corresponding to the pressed one-touch button in step S61. In step S62, the CPU 5 checks whether the G3 facsimile mode is designated. In step S63, the CUP 5 checks whether the Internet FAX mode is designated.

If the Internet FAX mode is designated, the CPU 5 checks a predetermined priority order in step S64. If the Internet FAX mode has priority, the CPU 5 selects the Internet FAX mode in step S65. If the G3 facsimile mode has priority, the CPU 5 selects the G3 facsimile mode in step S66. If the Internet FAX mode is designated in step S63, the flow advances to step S66 to select the G3 facsimile mode.

If the G3 facsimile mode is designated in step S62, the CPU 5 checks whether the Internet FAX mode is designated in step S67. If YES in step S67, the flow advances to step S65 to select the Internet FAX mode. If NO in step S67, there is no destination, so the CPU 5 indicates designation mode error in step S68.

Figure 5:
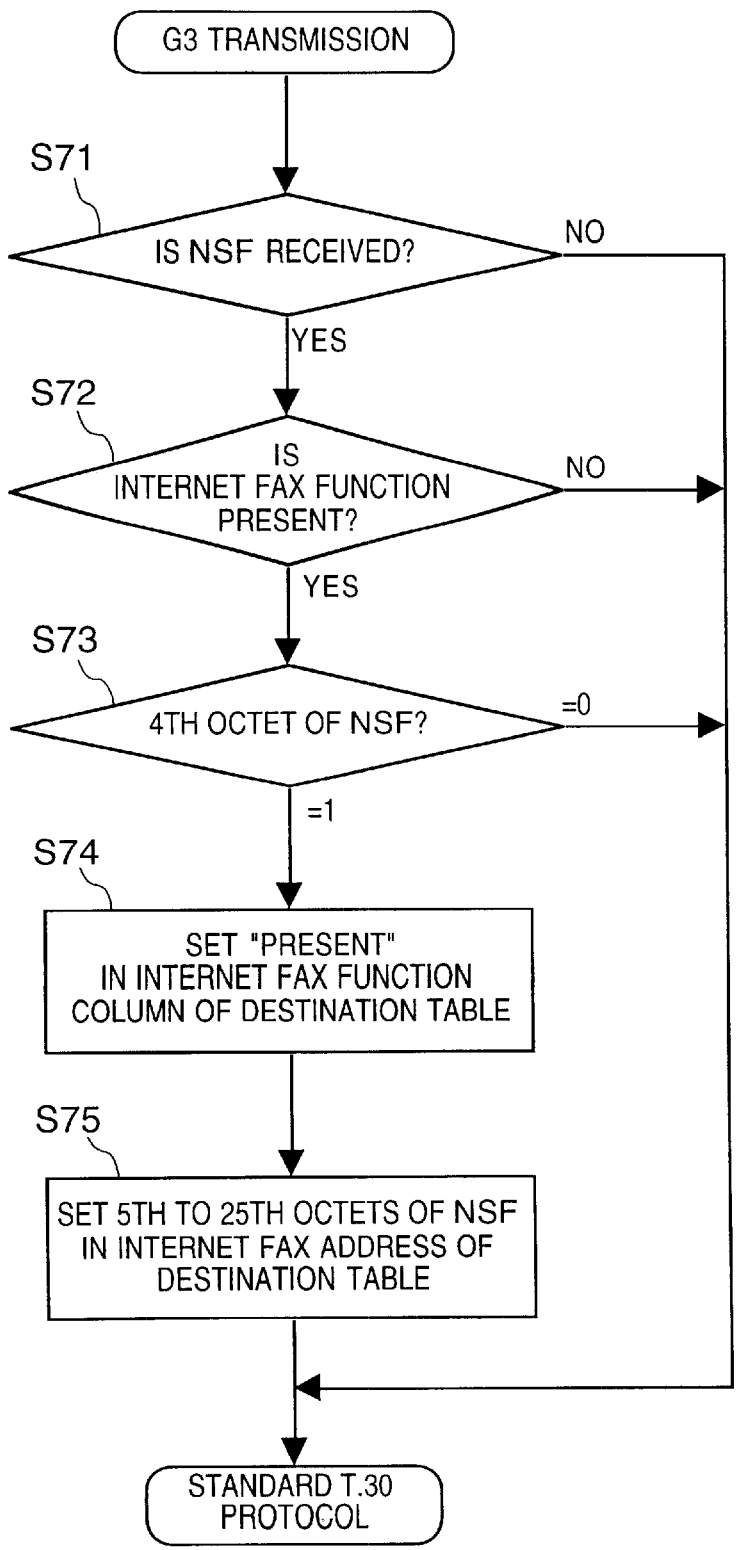
FIG. 5 is a flow chart showing G3 transmission by an Internet FAX apparatus of the first embodiment.

FIG. 5 is a flow chart showing G3 transmission by the Internet FAX apparatus of the first embodiment. A process procedure on the transmitting side in the G3 facsimile mode will be described below with reference to FIG. 5.

For example, an operator sets an original and presses one-touch button 01 of the operation unit. The CPU 5 checks destination 01 in the destination table shown in FIG. 3 and determines that destination 01 is incapable of performing an Internet FAX. Therefore, the CPU 5 initiates a call to the telephone network and starts transmission in the G3 facsimile mode. Note that even when the CPU 5 determines that the destination is incapable of performing a G3 FAX and Internet FAX, these functions may be just unset although they are present.

After initiating the call, the CPU 5 receives FIF of NSF from the receiving side in step S71 and checks the Internet FAX function of its own apparatus in step S72. If the apparatus is capable of performing an Internet FAX, the CPU 5 checks the presence/absence of the Internet FAX function in the fourth octet of the received FIF of NSF in step S73. Note that FIG. 5 is a flow chart of the Internet apparatus, so an Internet FAX is naturally possible because in the present situation no apparatuses exist which exclusively perform only Internet FAX transmission or reception. Therefore step S72 is omitted.

If the fourth octet of the FIF of NSF indicates that the Internet FAX function is present (00000001), the flow advances to step S74, and the CPU 5 sets "present" in the Internet FAX function column of corresponding destination 01 in the destination table. In step S75, the CPU 5 stores the Internet address indicated by the fifth and subsequent octets in the Internet address column of corresponding destination 01 in the destination table. After transmitting TSI and FIF of NSS, the CPU transmits a FAX message in accordance with the standard T.30 protocol.

Figure 6:
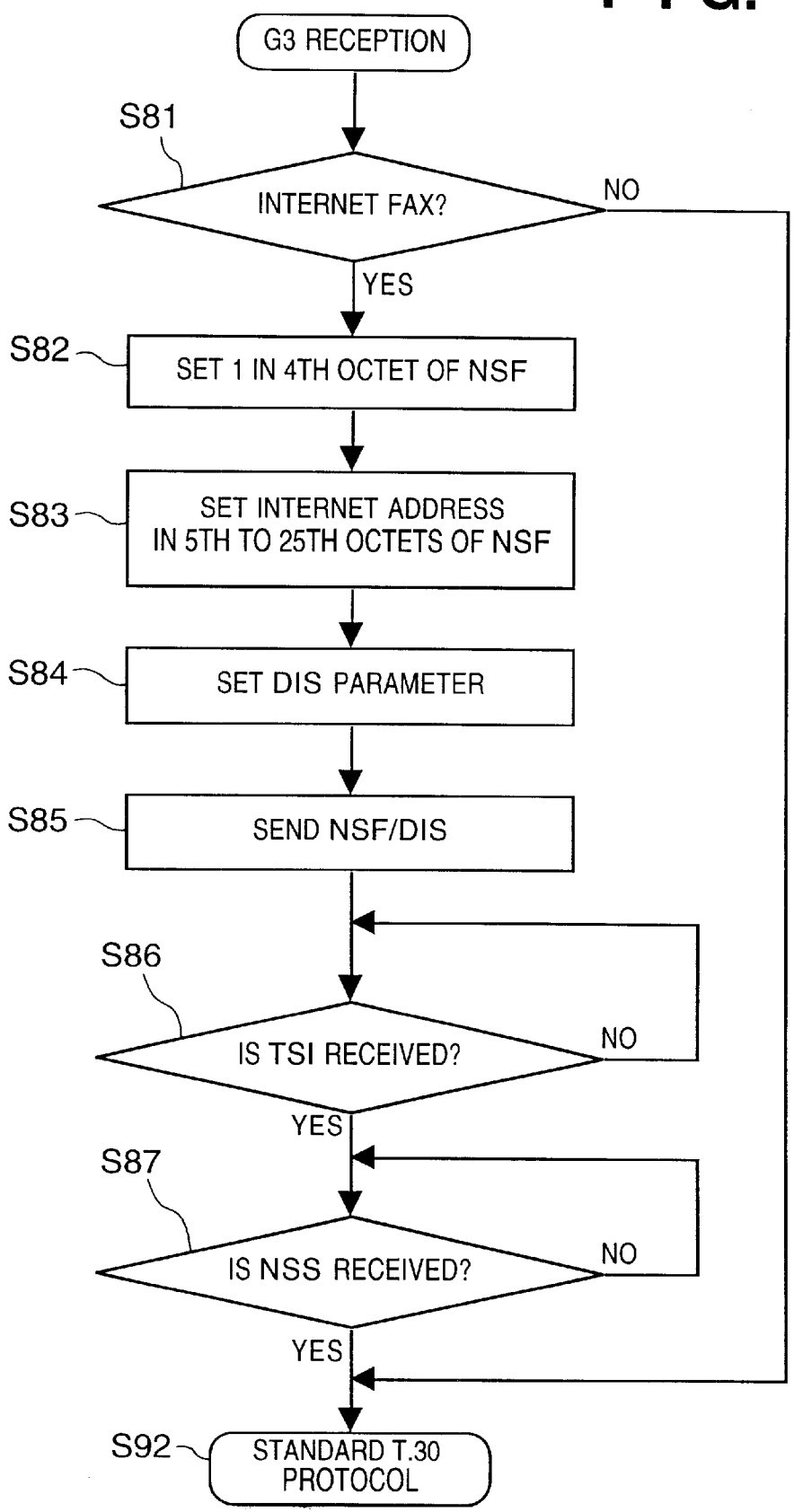
FIG. 6 is a flow chart showing G3 reception by the Internet FAX apparatus of the first embodiment.

FIG. 6 is a flow chart showing G3 reception by the Internet FAX apparatus of the first embodiment. An operation procedure on the receiving side in the G3 facsimile mode will be described below with reference to FIG. 6.

First, when the apparatus is called from the telephone network, the NCU receives the call and starts an automatic G3 reception procedure.

In step S81, the CPU 5 checks whether its own apparatus has the Internet FAX function. If the apparatus has the Internet FAX function, the CPU 5 sets the fourth octet of FIF of NSF in step S82. Step S81 can also be omitted like step S72 shown in FIG. 5. In step S83, the CPU 5 stores the Internet address of its own apparatus in the fifth and subsequent octets. In step S84, the CPU sets a DIS parameter. In step S85, the CPU 5 transmits FIF of NSF and DIS.

When receiving TSI and FIF of NSS in steps S86 and S87, respectively, the CPU 5 performs the standard T.30 protocol in step S92.

If the same destination 01 is designated in transmission after that, the CPU 5 selects the Internet FAX mode in accordance with the flow chart of destination mode selection shown in FIG. 4 and transmits e-mail to the Internet address, since the data indicating that the Internet FAX function is present and the Internet address are set in 01 of the destination table shown in FIG. 3.

Figure 7:
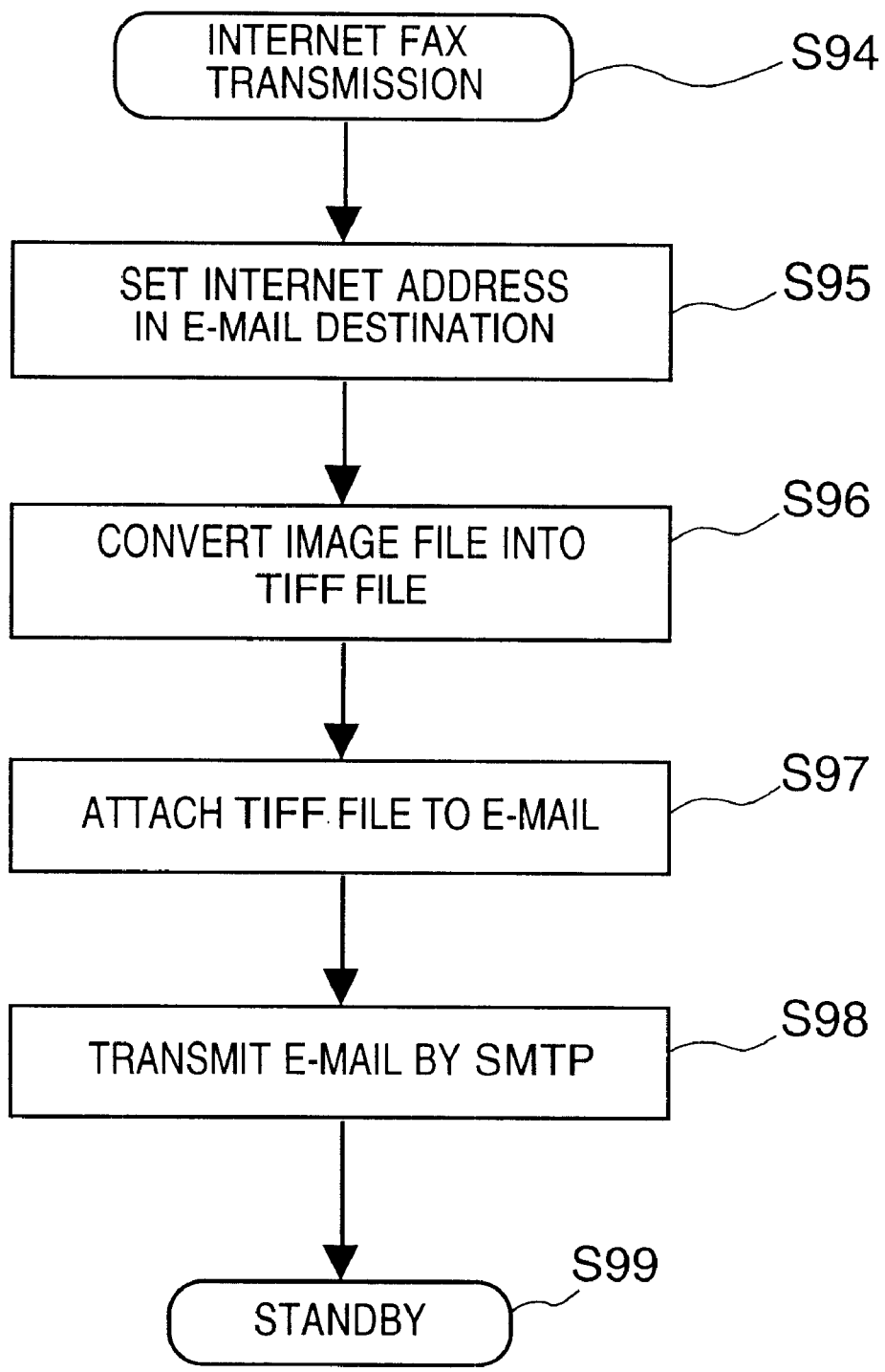
FIG. 7 is a flow chart showing Internet FAX transmission by the Internet FAX apparatus of the first embodiment.

FIG. 7 is a flow chart showing Internet FAX transmission by the Internet FAX apparatus of the first embodiment. An operation procedure on the transmitting side in the Internet FAX mode will be described below with reference to FIG. 7.

In step S94, the CPU 5 starts the Internet FAX mode. In step S95, the CPU 5 sets the Internet address in the destination table shown in FIG. 3 as the destination of e-mail. In step S96, the CPU 5 converts an image file into a TIFF file. In step S97, the CPU 5 attaches the TIFF file to the e-mail file. In step S98, the CPU 5 transmits the e-mail by SMTP. In step S99, the flow returns to a standby state.

Figure 8:
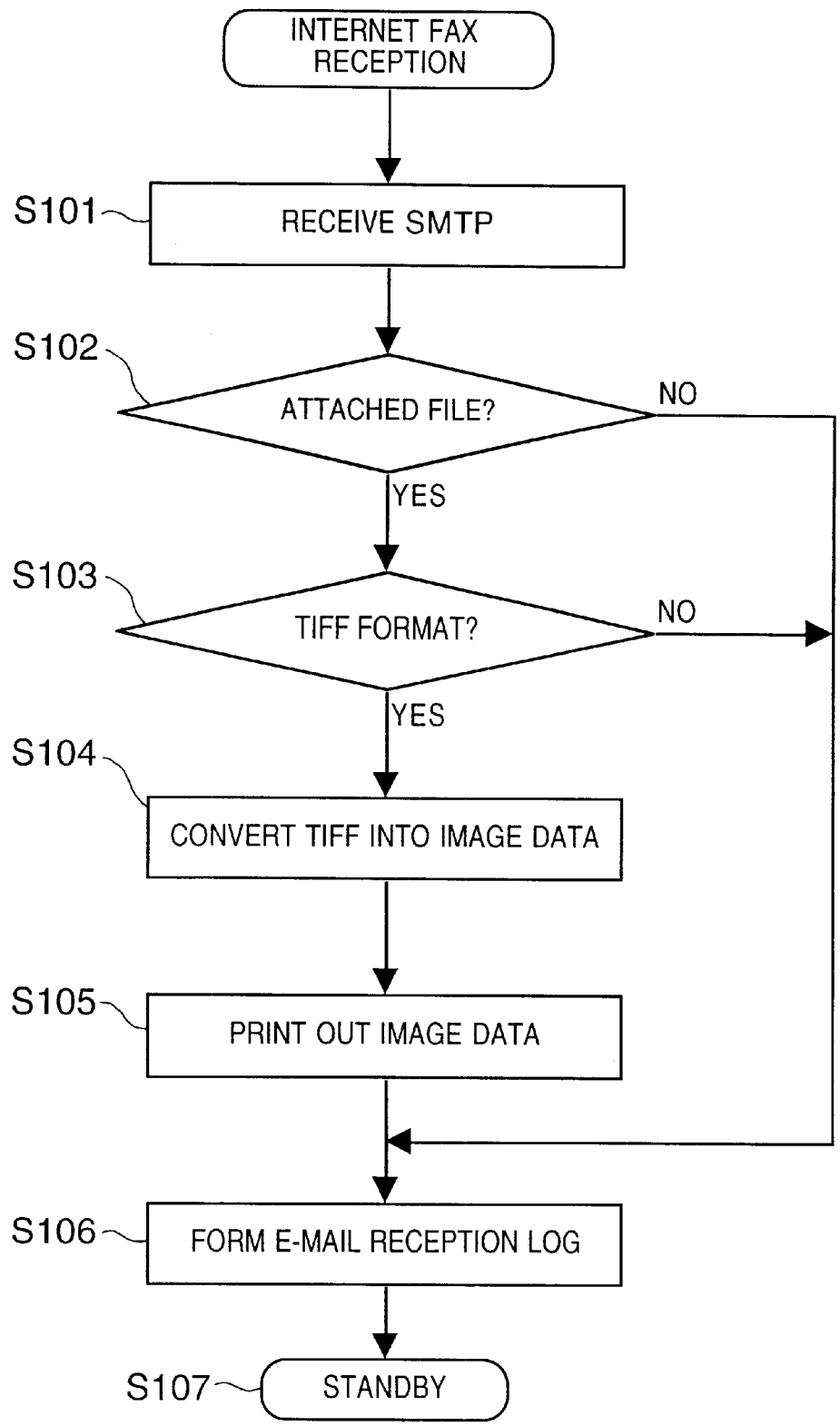
FIG. 8 is a flow chart showing Internet FAX reception by the Internet FAX apparatus of the first embodiment.

FIG. 8 is a flow chart showing Internet FAX reception by the Internet FAX apparatus of the first embodiment. An operation procedure on the receiving side in the Internet FAX mode will be described below with reference to FIG. 8.

In step S101, the CPU 5 receives e-mail by SMTP. IN step S102, the CPU 5 checks an attached file of the e-mail. In step S103, the CPU 5 checks whether the attached file is TIFF. If the file is TIFF, the flow advances to step S104, and the CPU 5 converts this TIFF data into image data. In step S105, the CPU 5 controls the printer to print out the image data. In step S106, the CPU 5 forms an e-mail reception log. In step S107, the flow returns to a standby state.

If no file exists in step S102 or the file is not TIFF in step S103, the flow advances to step S106, and the CPU 5 forms an e-mail reception log. After that, the flow returns to the standby state in step S107.

As described above, the Internet FAX apparatus on the receiving side transmits the Internet FAX function and the Internet address by NSF. The Internet FAX apparatus on the transmitting side stores these pieces of information in the destination data. This allows the Internet FAX apparatus on the transmitting side to communicate with the same destination by Internet FAX in the next transmission.

In this embodiment, a mode is selected in accordance with the predetermined destination priority order. However, it is also possible to allow a user to select a mode by displaying the data on the operation unit.

Also, in this embodiment, the Internet capability and address are stored in an FIF of NSF signal. However, these data can also be communicated by using some other signal.

Furthermore, although an Internet FAX is communicated by using e-mail in this embodiment, the same effect can be obtained by transmitting and receiving a T.30 frame or image data by using TCP/IP packets in real time.

<Description of Operation of Internet FAX Apparatus of Second Embodiment>

The contents of the format of a T.30 FIF of NSS signal transmitted from an Internet FAX apparatus on the transmitting side will be described below with reference to FIG. 9.

The FIF format of NSS is composed of 25 octets. The first and second octets store a country identification code. The third octet stores a maker code. The fourth octet indicates the presence/absence of an instruction to switch to the Internet FAX mode of an Internet FAX apparatus on the receiving side. 00000001 indicates the presence of the instruction to switch to the Internet FAX mode; 00000000 indicates the absence of the instruction to switch to the Internet FAX mode. The fifth to twenty-fifth octets store the Internet address of the Internet FAX apparatus on the transmitting side. That is, the Internet FAX apparatus on the transmitting side sends the instruction to switch to the Internet FAX mode to a partner of transmission by setting 00000001 in the fourth octet and informs the transmission partner of the Internet address by the fifth to twenty-fifth octets of the FIF of NSS.

The Internet FAX apparatus of the second embodiment can operate in the G3 facsimile mode and Internet FAX mode. The operation of this Internet FAX apparatus will be described below with reference to a T.30 FIF of NSF format shown in FIG. 2, the T.30 FIF of NSS format shown in FIG. 9, a destination data format shown in FIG. 3, a flow chart of mode selection shown in FIG. 4, a flow chart of G3 transmission by the Internet FAX apparatus shown in FIG. 10, a flow chart of G3 reception by the Internet FAX apparatus shown in FIG. 11, a flow chart of Internet FAX transmission by the Internet FAX apparatus shown in FIG. 7, and a flow chart of Internet FAX reception by the Internet FAX apparatus shown in FIG. 8. Note that the Internet FAX apparatus of the second embodiment performs G3 FAX communication whenever the apparatus determines that the communication partner is not an Internet FAX apparatus.

A summary of the G3 transmission procedure of the Internet FAX apparatus according to the second embodiment will be described below. Since this apparatus basically operates in accordance with the standard T.30 protocol, only an additional operation of this second embodiment will be described.

When receiving FIF of NSF from an apparatus on the receiving side, the Internet FAX apparatus of this embodiment checks the presence/absence of the Internet FAX function in the fourth octet of the FIF of NSF. If the Internet FAX function is present (00000001), the Internet FAX apparatus stores the Internet address indicated by the fifth and subsequent octets in a destination table.

If it is determined from the FIF of NSF that the apparatus on the receiving side has the Internet FAX function, the Internet FAX apparatus sets the instruction to switch to the Internet FAX mode (00000001) in the fourth octet of the FIF of NSS signal and sets the Internet address of this apparatus on the transmitting side in the fifth and subsequent octets.

When receiving CFR after transmitting FIF of NSS, the Internet FAX apparatus sends a training signal and subsequently a FAX message in accordance with the standard T.30 protocol.

After that, transmission to the apparatus on the receiving side is performed by Internet FAX transmission by using the Internet address received by the FIF of NSF.

A summary of the G3 reception procedure of the Internet FAX apparatus according to the second embodiment will be described below. This apparatus basically operates in accordance with the standard T.30 protocol, so only an additional operation of this embodiment will be described.

Since the Internet FAX apparatus on the receiving side is capable of performing an Internet FAX, the apparatus sets the fourth octet (00000001) of FIF of NSF when transmitting the FIF of NSF.

Upon receiving FIF of NSS, the Internet FAX apparatus checks the presence/absence of the instruction to switch to the Internet FAX mode in the fourth octet. If the instruction is present (00000001), the apparatus stores the Internet address indicated by the fifth and subsequent octets of the FIF of NSS in the destination table. The apparatus then performs ordinary G3 reception.

After that, transmission to the apparatus on the receiving side is performed by Internet FAX transmission by using the Internet address received by the FIF of NSS.

(Operation Flow Charts of Internet FAX Apparatus of Second Embodiment)

FIG. 4 is a flow chart showing mode selection by the Internet FAX apparatus of the second embodiment. This flow chart is the same as in the first embodiment, so a detailed description thereof will be omitted.

Figure 10:
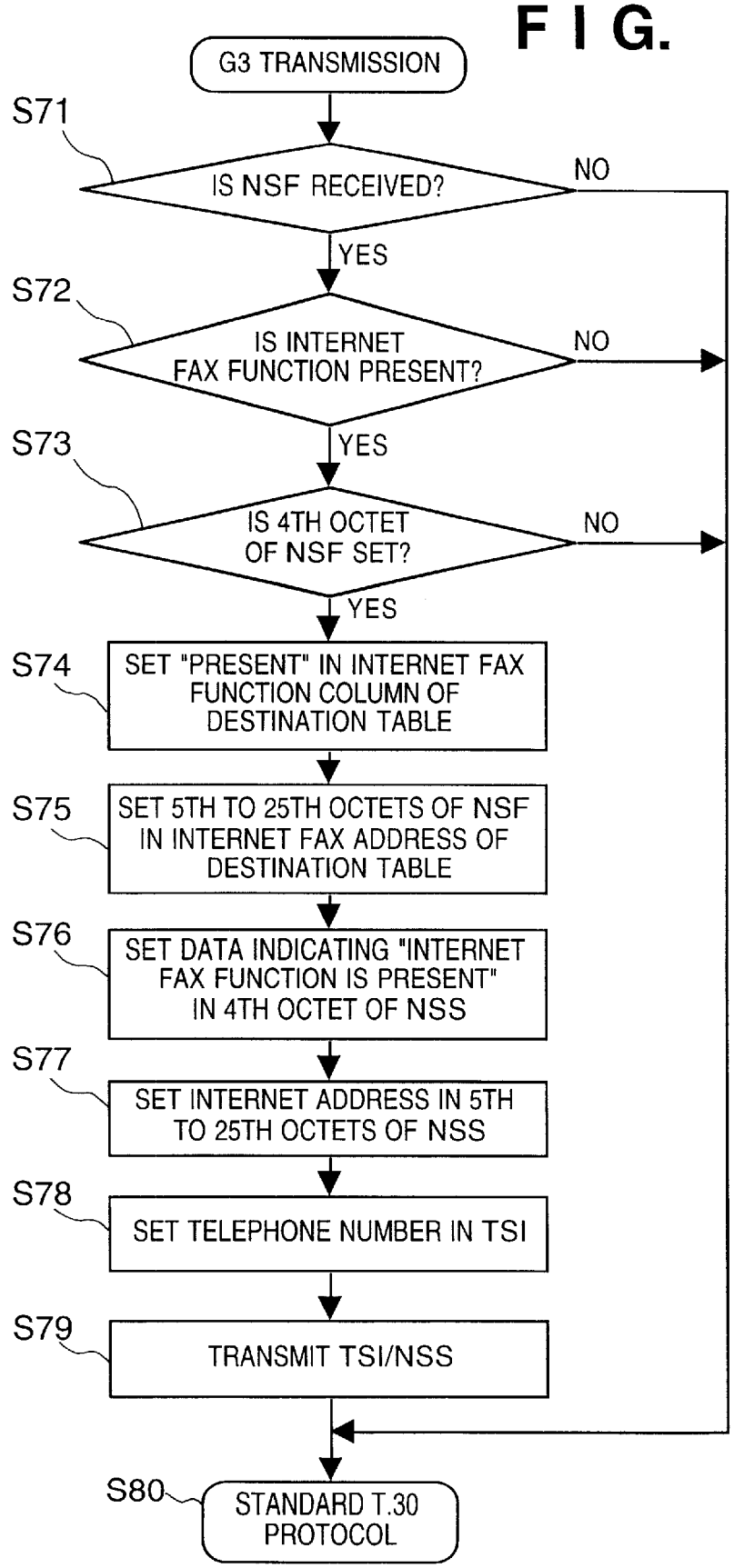
FIG. 10 is a flow chart showing G3 transmission by an Internet FAX apparatus of the second embodiment.

FIG. 10 is a flow chart showing G3 transmission by the Internet FAX apparatus of the second embodiment. A process procedure on the transmitting side in the G3 facsimile mode will be described below with reference to FIG. 10.

For example, an operator sets an original and presses one-touch button 01 of the operation unit. A CPU 5 shown in FIG. 1 checks destination 01 in the destination table shown in FIG. 3 and determines that destination 01 is incapable of performing an Internet FAX. Therefore, the CPU 5 initiates a call to the telephone network and starts transmission in the G3 facsimile mode. Note that even when the CPU 5 determines that the destination is incapable of performing a G3 FAX and Internet FAX, these functions may be just unset although they are present.

After initiating the call, the CPU 5 receives NSF from the receiving side in step S71 and checks the Internet FAX function of its own apparatus in step S72. If the apparatus is capable of performing an Internet FAX, the CPU 5 checks the presence/absence of the Internet FAX function in the fourth octet of the received NSF in step S73. Note that FIG. 10 is a flow chart of the Internet FAX apparatus, so an Internet FAX is naturally possible because in the present situation no apparatuses exist which exclusively perform only Internet FAX transmission or reception. Therefore, step S72 can be omitted.

If the fourth octet of the FIF of NSF indicates that the Internet FAX function is present (00000001), the flow advances to step S74, and the CPU 5 sets "present" in the Internet FAX function column of corresponding destination 01 in the destination table. In step S75, the CPU 5 stores the Internet address indicated by the fifth subsequent octets in the Internet address column of corresponding destination 01 in the destination table.

In step S76, the CPU 5 sets the instruction to switch to the Internet FAX mode in the fourth octet of the FIF of NSS signal. In step S77, the CPU 5 sets the Internet address of its own apparatus in the fifth and subsequent octets. In step S78, the CPU 5 sets the telephone number, e.g., (098-765-4321), of its own apparatus in TSI. In step S79, the CPU 5 transmits TSI and FIF of NSS. In step S80, the CPU 5 transmits a FAX message in accordance with the standard T.30 protocol.

Figure 11:
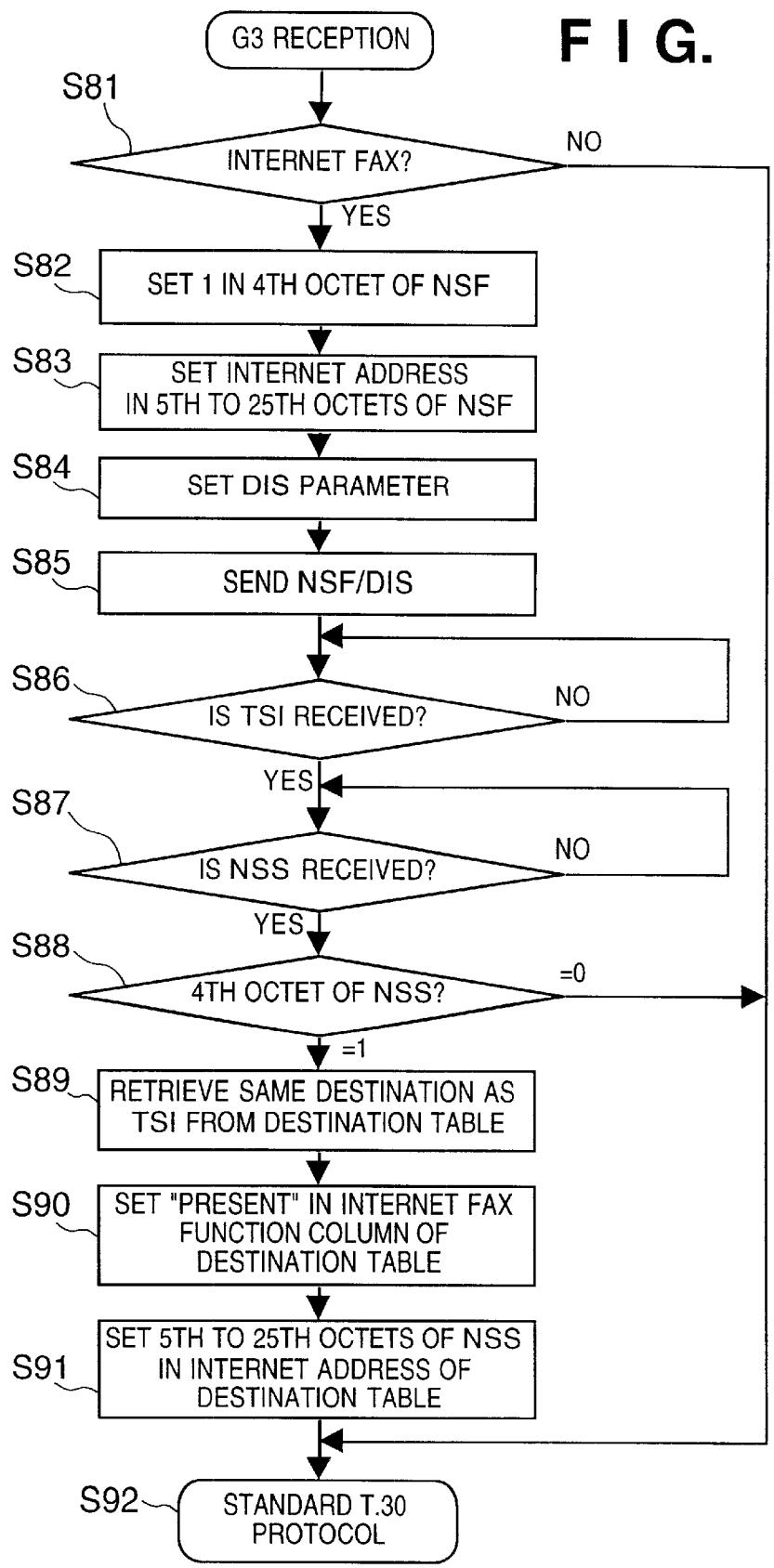
FIG. 11 is a flow chart showing G3 reception by the Internet FAX apparatus of the second embodiment.

FIG. 11 is a flow chart showing G3 reception by the Internet FAX apparatus of the second embodiment. An operation procedure on the receiving side in the G3 facsimile mode will be described below with reference to FIG. 11.

First, when the apparatus is called from the telephone network, the NCU receives the call and starts an automatic G3 reception procedure.

In step S81, the CPU 5 checks whether its own apparatus has the Internet FAX function. If the apparatus has the Internet FAX function, the CPU 5 sets the fourth octet of FIF of NSF in step S82. Step S81 can also be omitted like step S72 shown in FIG. 10. In step S83, the CPU 5 stores the Internet address of its own apparatus in the fifth and subsequent octets. In step S84, the CPU 5 sets a DIS parameter. In step S85, the CPU 5 transmits FIF of NSF and DIS.

When receiving TSI and FIF of NSS in steps S86 and S87, respectively, the flow advances to step S88, and the CPU 5 checks whether the instruction to switch to the Internet FAX mode is set in the fourth octet of the FIF of NSS. If the instruction is present, the flow advances to step S89, and the CPU 5 checks TSI, e.g., the same destination 03 as (098-765-4321) in the destination table shown in FIG. 3. In step S90, the CPU 5 sets "present" in the Internet function column of one-touch number 03 in the destination table. In step S91, the CPU 5 stores the Internet address indicated by the fifth and subsequent octets of the FIF of NSS in the corresponding position of one-touch number 03 in the destination table.

In step S92, the CPU 5 performs the standard T.30 protocol.

If destination 01 is designated on the transmitting side and the same destination 03 is designated on the receiving side in transmission after that, the CPU 5 selects the Internet FAX mode in accordance with the flow chart of destination mode selection shown in FIG. 4 and transmits e-mail to the Internet address, since the data indicating that the Internet FAX function is present and the Internet address are set in 01 or 03 of the destination table shown in FIG. 3.

Internet FAX transmission and reception procedures of the Internet FAX apparatus of the second embodiment are identical with the procedures described in the first embodiment with reference to FIGS. 7 and 8.

As described above, the Internet FAX apparatus on the transmitting side transmits the Internet FAX function and the Internet address by FIF of NSS. The Internet FAX apparatus on the receiving side stores these pieces of information in the destination data. This allows the Internet FAX apparatus on the receiving side to communicate with the transmitting side by an Internet FAX in the next transmission. Also, the Internet FAX apparatus on the receiving side transmits the Internet FAX function and the Internet address by FIF of NSF. The Internet FAX apparatus on the transmitting side stores these pieces of information in the destination data. This allows the Internet FAX apparatus on the transmitting side to communicate with the same destination by an Internet FAX in the next transmission.

In this embodiment, a mode is selected in accordance with the predetermined destination priority order. However, it is also possible to allow a user to select a mode by displaying the data on the operation unit.

Also, in this embodiment the Internet capability and address are stored in an NSS signal. However, these data can also be communicated by using some other signal.

Furthermore, although an Internet FAX is communicated by using e-mail in this embodiment, the same effect can be obtained by transmitting and receiving a T.30 frame or image data by using TCP/IP packets in real time.

<Description of Operation of Internet FAX Apparatus of Third Embodiment>

An Internet FAX apparatus of the third embodiment can operate in the G3 facsimile mode and Internet FAX mode. The operation of this Internet FAX apparatus will be described below with reference to a T.30 NSF format shown in FIG. 2, a T.30 FIF of NSS format shown in FIG. 9, a flow chart of a G3 transmission procedure shown in FIG. 12, a destination data format shown in FIG. 3, a flow chart of a protocol shown in FIG. 13, a flow chart of Internet FAX image transmission shown in FIG. 14, and a flow chart of Internet FAX image reception shown in FIG. 15. Note that the Internet FAX apparatus of the third embodiment performs G3 FAX communication whenever the apparatus determines that the communication partner is not an Internet FAX apparatus.

Figure 12:
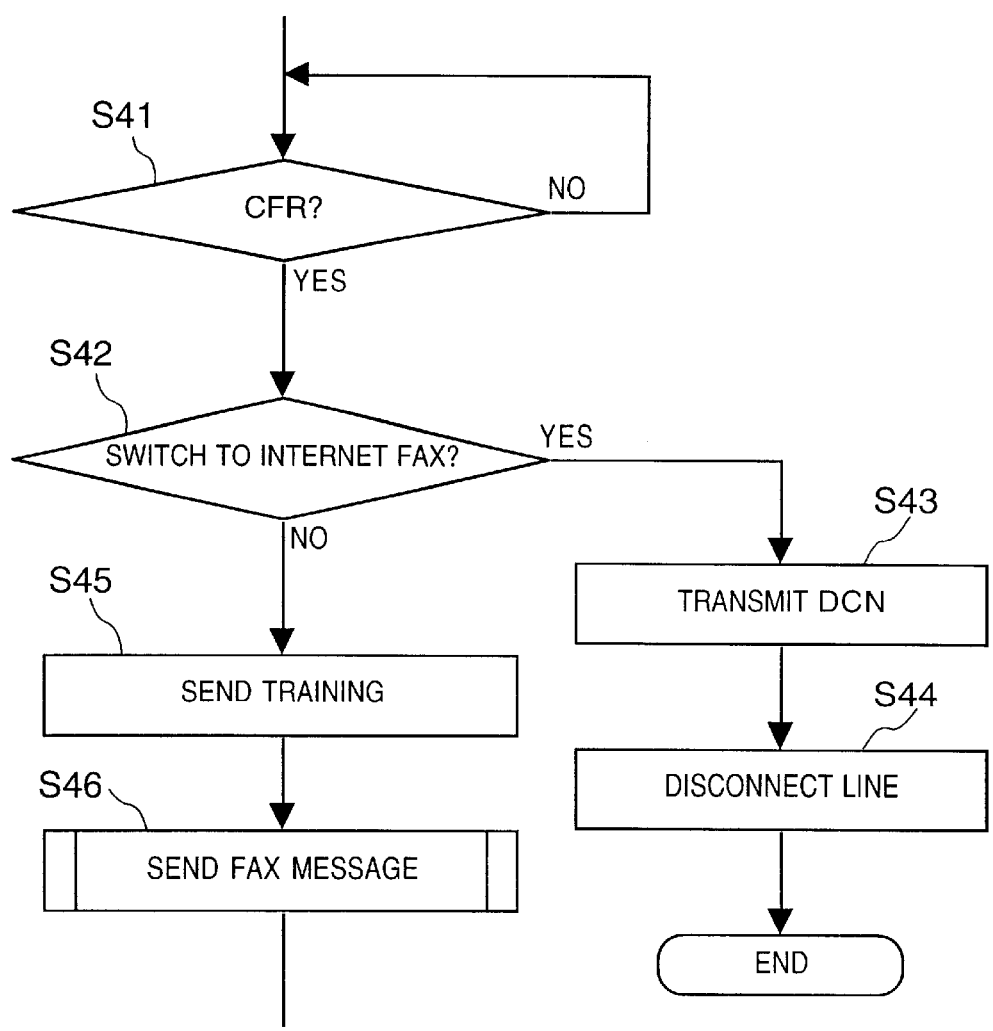
FIG. 12 is a flow chart showing the concept of transmission control by an Internet FAX apparatus of the third embodiment.

FIG. 12 is a flow chart showing a part of a G3 transmission procedure. A summary of the transmission procedure in the third embodiment will be described below with reference to FIG. 12. Since this apparatus basically operates in accordance with the standard T.30 protocol, only an additional operation of this embodiment will be described.

When receiving FIF of NSF from an apparatus on the receiving side, the Internet FAX apparatus of this embodiment checks the presence/absence of the Internet FAX function in the fourth octet of FIF of NSF. If the Internet FAX function is present (00000001), the Internet FAX apparatus stores the Internet address indicated by the fifth and subsequent octets in a destination table.

If it is determined from the FIF of NSF that the apparatus on the receiving side has the Internet FAX function, the Internet FAX apparatus sets an instruction to switch to the Internet FAX mode (00000001) in the fourth octet of the FIF of NSS signal and sets the Internet address of this apparatus on the transmitting side in the fifth and subsequent octets.

When receiving CFR after transmitting FIF of NSS (S41), the Internet FAX apparatus checks whether the mode can be switched to the Internet FAX mode (S42). If the mode can be switched (YES), the Internet FAX apparatus transmits DCN and then disconnects the line (S43 and S44). If the mode cannot be switched to the Internet FAX mode (NO), the Internet FAX apparatus sends a training signal and subsequently a FAX message in accordance with the standard T.30 protocol after receiving CFR (S45 and S46).

A summary of the G3 reception procedure of the Internet FAX apparatus according to the third embodiment will be described below. This apparatus basically operates in accordance with the standard T.30 protocol, so only an additional operation of this embodiment will be described.

Since the Internet FAX apparatus on the receiving side is capable of performing an Internet FAX, the apparatus sets the fourth octet (00000001) of FIF of NSF when transmitting the FIF of NSF. The apparatus stores its Internet address in the fifth and subsequent octets.

Upon receiving FIF of NSS, the Internet FAX apparatus checks the presence/absence of the instruction to switch to the Internet FAX mode in the fourth octet. If the instruction is present (00000001), the apparatus transmits CFR. The apparatus disconnects the line after receiving DCN. If the instruction is absent, the apparatus transmits CFR and perform ordinary G3 reception. The apparatus stores the Internet address indicated by the fifth and subsequent octets of the FIF of NSS in the destination table.

Figure 13:
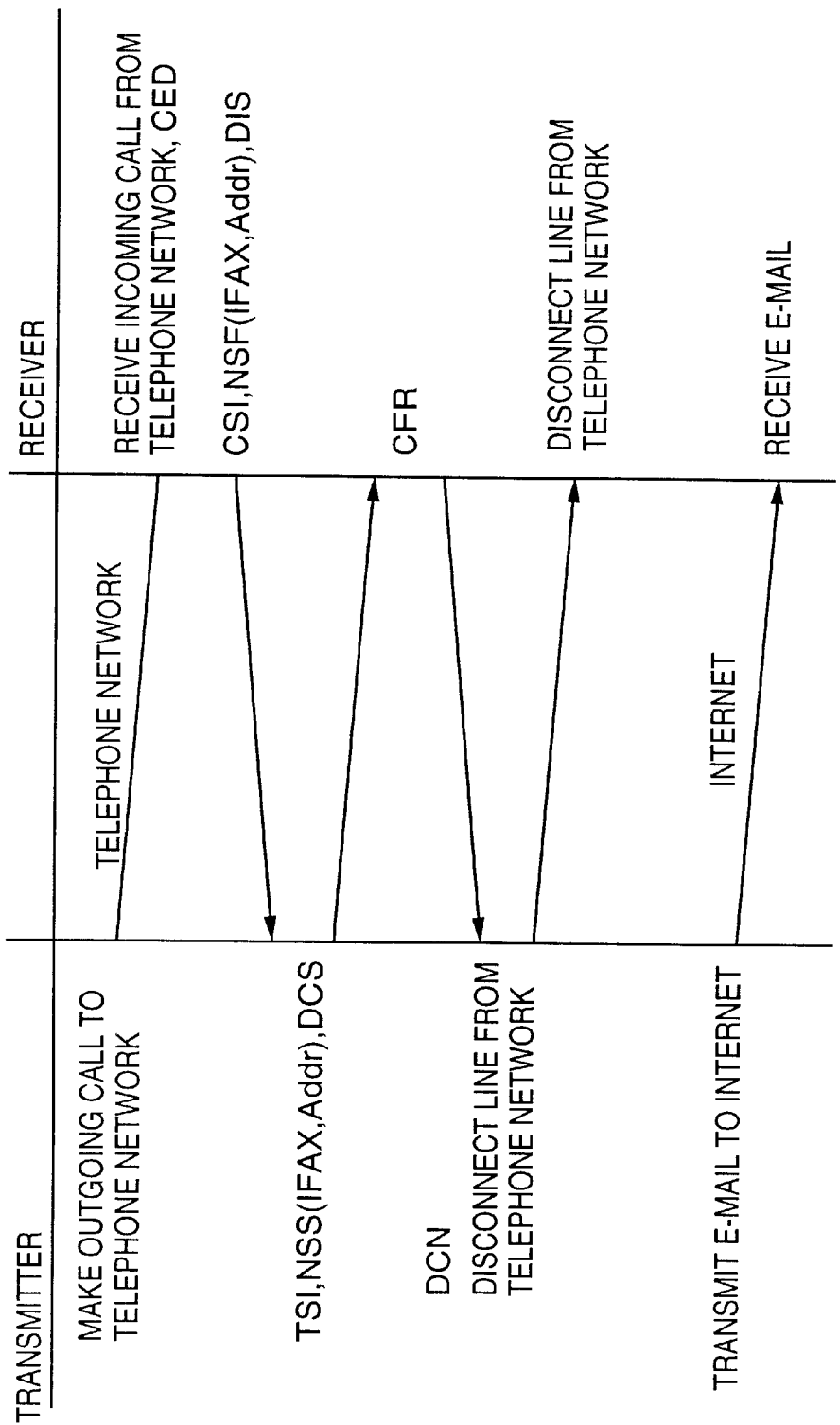
FIG. 13 is a view showing the protocol of the Internet FAX apparatus of the third embodiment.

FIG. 13 is a view showing a protocol in the third embodiment. Interruption of transmission and reception in the G3 facsimile mode and switching to the Internet FAX mode will be described below with reference to FIG. 13.

① A transmitting apparatus selects the G3 facsimile mode and initiates a call to a telephone network.
② A receiving apparatus detects the incoming call from the telephone network, sends CED, and then transmits CSI, FIF of NSF, and DIS.
③ The transmitting apparatus checks the FIF of NSF signal from the receiving apparatus. If the transmitting apparatus detects that the receiving apparatus has the Internet FAX function, the transmitting apparatus saves the Internet address of the receiving apparatus. The transmitting apparatus sets the instruction to switch to the Internet FAX mode in FIF of NSS, stores the Internet address in the FIF of NSS, and transmits the FIF of NSS.
④ The receiving apparatus sends CFR and waits for DCN.
⑤ The transmitting apparatus transmits the DCN and disconnects the line.
⑥ The receiving apparatus receives the DCN and disconnects the line.
⑦ The transmitting apparatus sets the saved Internet address in the destination and transmits image data in the Internet FAX mode.

Figure 14:
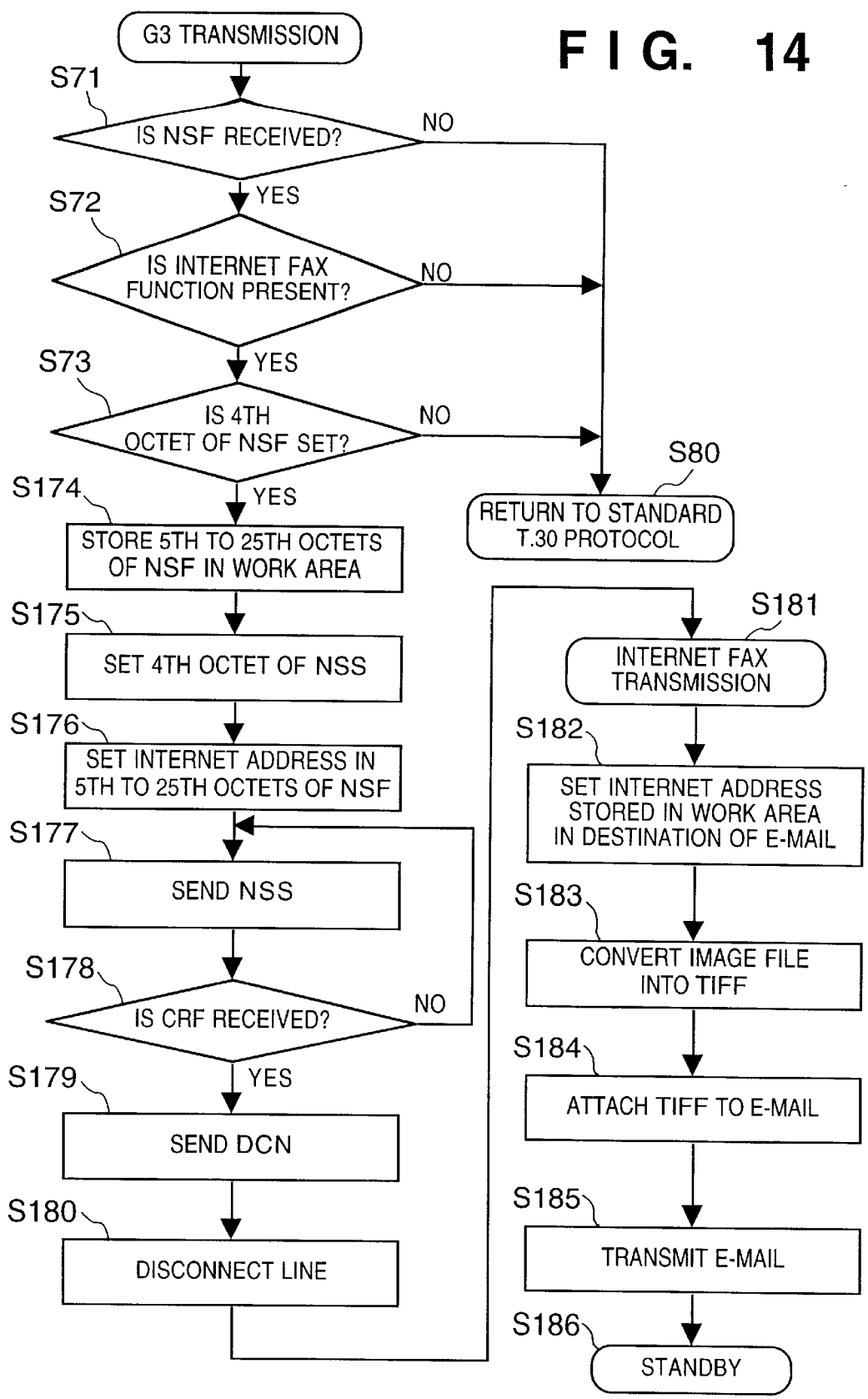
FIG. 14 is a flow chart showing switching from G3 transmission to Internet FAX transmission by the Internet FAX apparatus of the third embodiment.

FIG. 14 is a flow chart showing a procedure of switching to the Internet FAX mode in an apparatus on the transmitting side.

For example, an operator sets an original and presses one-touch button 01 of the operation unit. A CPU 5 shown in FIG. 1 checks destination 01 in the destination table shown in FIG. 3 and determines that destination 01 is incapable of performing an Internet FAX. Therefore, the CPU 5 initiates a call to the telephone network and starts transmission in the G3 facsimile mode. Note that even when the CPU 5 determines that the destination is incapable of performing an Internet FAX, this function may be just unset although it is present.

After initiating the call, the CPU 5 receives FIF of NSF from the receiving apparatus in step S71. In step S72, the CPU 5 checks the Internet FAX function of its own apparatus. If the apparatus is capable of performing an Internet FAX, the flow advances to step S73, and the CPU 5 checks the presence/absence of the Internet FAX function in the fourth octet of the received FIF of NSF. If the Internet FAX function is "present" in the fourth octet, the flow advances to step 5174, and the CPU 5 stores the Internet address indicated by the fifth and subsequent octets in the work area of a RAM 12 shown in FIG. 1. Note that FIG. 14 is a flow chart of the Internet FAX apparatus, so an Internet FAX is naturally possible because in the present situation no apparatuses exist which exclusively perform only Internet FAX transmission or reception. Therefore, step S72 can be omitted.

Next, in step 5175, the CPU 5 sets the instruction to switch to the Internet FAX mode (00000001) in the fourth octet of the FIF of NSS signal. In step 5176, the CPU 5 sets the Internet address of its own apparatus in the fifth and subsequent octets. In step S177, the CPU 5 transmits the FIF of NSS.

In step S178, the CPU 5 waits for CFR. When receiving the CFR, the CPU 5 transmits DCN in step S179 and disconnects the line in step S180.

In step S181, the CPU 5 starts transmission in the Internet FAX mode. In step S182, the CPU 5 sets the Internet address, which is stored in the work area in step S174, in the destination of e-mail. In step S183, the CPU 5 converts an image file into a TIFF file. In step S184, the CPU 5 attaches the TIFF file to e-mail. In step S185, the CPU 5 transmits the e-mail by SMTP. In step S186, the flow returns to a standby state.

If the mode cannot be switched to the Internet FAX mode in steps S71, S72, and S73, the flow advances to step S80, and the CPU 5 sends a FAX message in accordance with the standard T.30 protocol.

Figure 15:
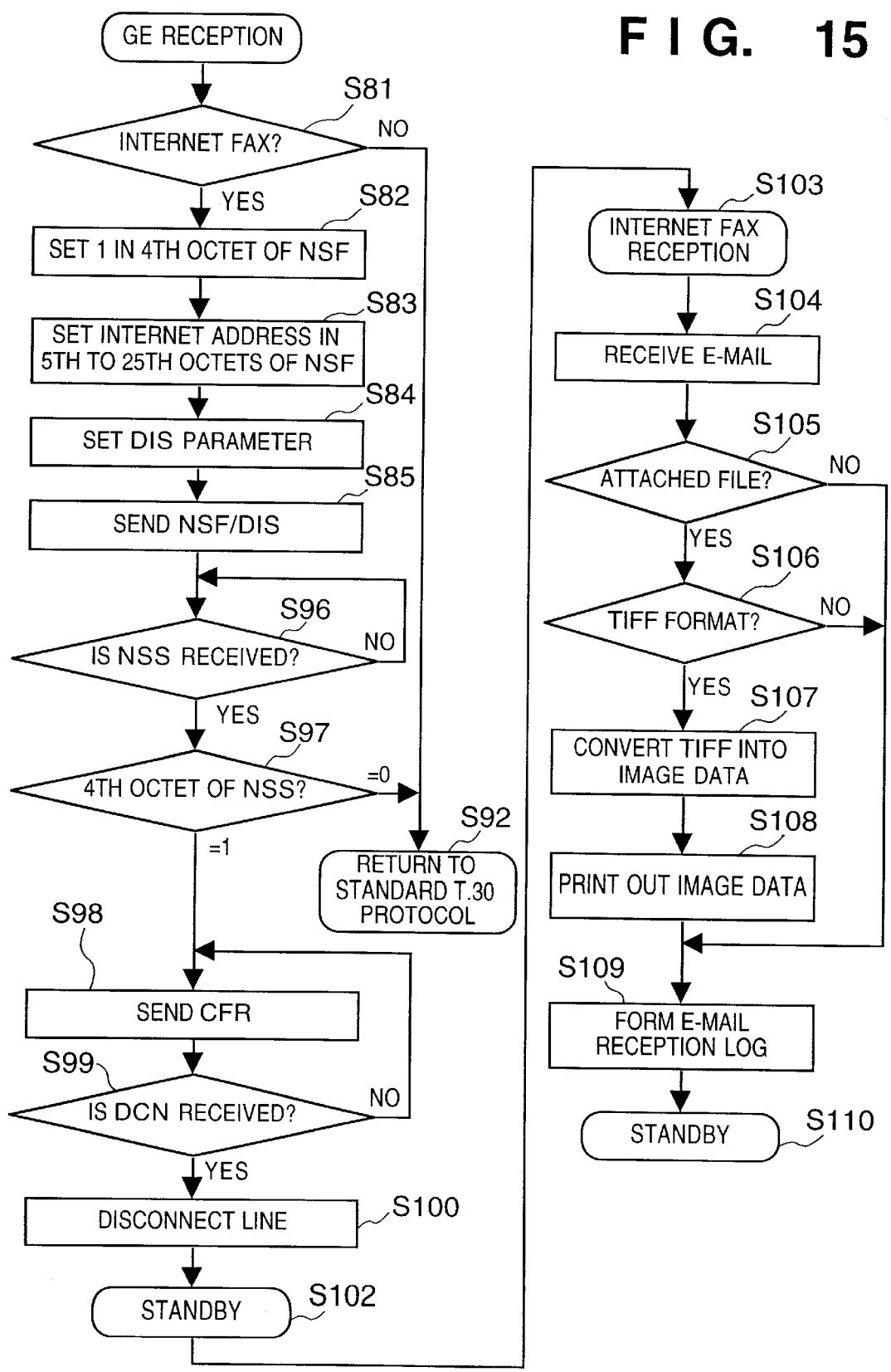
FIG. 15 is a flow chart showing switching from G3 reception to Internet FAX reception by the Internet FAX apparatus of the third embodiment.

FIG. 15 is a flow chart showing a procedure of switching to the Internet FAX mode in an apparatus on the receiving side.

First, when the apparatus is called from the telephone network, an NCU receives the call and starts an automatic G3 reception procedure.

In step S81, the CPU 5 checks whether its own apparatus has the Internet FAX function. If the apparatus has the Internet FAX function, the CPU 5 sets the fourth octet of FIF of NSF in step S82. In step S83, the CPU 5 stores the Internet address of its own apparatus in the fifth and subsequent octets. In Step S84, the CPU 5 sets a DIS parameter. In step S85, the CPU 5 transmits FIF of NSF and DIS to the transmitting side.

When receiving FIF of NSS from the transmitting side in step S96, the CPU 5 checks in step S97 whether the instruction to switch to the Internet FAX mode is set in the fourth octet of the NSS. If the instruction is present, the CPU 5 transmits CFR to the transmitting side in step S98 and receives DCN from the transmitting side in step S99. After that, the CPU 5 disconnects the line in step S100, and the flow returns to a standby state in step S102. If the instruction is absent, the CPU 5 performs ordinary T.30 reception in step S92.

When the flow returns to the standby state in step S102, the transmitting side transmits image data by Internet FAX. Therefore, the CPU 5 starts receiving the Internet FAX in step S103.

In step S104, the CPU 5 receives e-mail by SMTP. In step S105, the CPU 5 checks whether the e-mail contains an attached file. If the e-mail contains an attached file, the flow advances to step S106, and the CPU 5 checks whether the attached file is a TIFF file. If the attached file is a TIFF file, the flow advances to step S107, and the CPU 5 converts the TIFF file into image data. In step S108, the CPU 5 determines that the image data is facsimile transmission image data, and, usually, controls a printer to print out the image data. In step S109, the CPU 5 forms an e-mail reception log. In step S110, the flow returns to a standby state.

If the e-mail contains no attached file in step S105 or the attached file is not a TIFF file in step S106, the flow advances to step S109 to form an e-mail reception log and returns to the standby state in step S110.

As described above, a receiving apparatus transmits its Internet FAX function and Internet address by FIF of NSF. This allows a transmitting apparatus to transmit by interrupting the G3 facsimile mode and switching to the Internet FAX mode.

In this embodiment, the receiving side does not use the Internet address transmitted on the FIF of NSS signal from the transmitting side. However, when FIF of NSS is transmitted in step 5177 of FIG. 14, the telephone number of the transmitting side is transmitted by TSI. If the fourth octet of the FIF of NSS is 1 in step S97 of FIG. 15, the Internet address in the fifth to twenty-fifth octets of the FIF of NSS is registered on the basis of the received telephone number. This allows the receiving side to perform Internet FAX transmission to the transmitting side in the next transmission.

Also, in this embodiment, the Internet capability and address are stored in an FIF of NSS signal. However, these data can also be communicated by using some other signal.

Furthermore, although Internet FAX is communicated by using e-mail in this embodiment, the same effect can be obtained by transmitting and receiving a T.30 frame or image data by using TCP/IP packets in real time.

The present invention can be applied to a system constituted by a plurality of devices (e.g., host computer, interface, reader, and printer) or to an apparatus (e.g., copying machine or facsimile) comprising a single device.

Further, the object of the present invention can also be achieved by providing a storage medium storing program codes of software for performing the aforesaid functions according to the embodiments to a system or an apparatus, reading the program codes with a computer (e.g., CPU or MPU) of the system or apparatus from the storage medium, and then executing the program. In this case, the program codes read from the storage medium realize the functions according to the embodiments, and the storage medium storing the program codes constitutes the invention.

Further, the storage medium, such as a floppy disk, a hard disk, an optical disk, a magnetooptical disk, CD-ROM, CD-R, a magnetic tape, a nonvolatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

When the present invention is applied to the above storage medium, it stores programs including the program codes corresponding to the flow charts described above.

As many apparently widely different embodiments of the present invention can be made without departing from the spirit and scope thereof, it is to be understood that the invention is not limited to the specific embodiments thereof except as defined in the attached claims.

What is claimed is:

1. An Internet facsimile apparatus comprising:
 a destination data storage unit arranged to store destination data containing at least a telephone number, presence/absence of an Internet facsimile function, and Internet address of each transmission destination;
 a first transmitting/receiving unit arranged to transmit and receive an image by an Internet facsimile transmitting/receiving function;

a second transmitting/receiving unit arranged to transmit and receive an image by an ordinary facsimile transmitting/receiving function;

a first Internet function informing unit arranged to transmit an Internet facsimile function and an Internet address of said Internet facsimile apparatus while said second transmitting/receiving unit is performing ordinary facsimile transmission;

a selecting unit arranged to select the telephone number or the Internet address based on a manual instruction in a case where both the telephone number and the Internet address are registered in said destination data storage unit; and a first Internet function detecting unit arranged to detect and register an Internet facsimile function and Internet address of a partner apparatus in corresponding destination data in said destination data storage unit while said second transmitting/receiving unit is performing ordinary facsimile reception, wherein when transmission is performed for the partner apparatus, said first transmitting/receiving unit communicates with the partner apparatus using the Internet address in the destination data in a case where said selecting unit selects the Internet address, while said second transmitting/receiving unit communicates with the partner apparatus by using the telephone number in the destination data in a case where said selecting unit selects the telephone number, the ordinary facsimile is a G3 facsimile, and said first Internet function informing unit or said first Internet function detecting unit transmits the Internet facsimile function and Internet address by using an FIF of NSS signal in the standard protocol, and the Internet facsimile function is stored in a fourth octet of the FIF of NSS signal and transmitted, and the Internet address is stored in fifth to twenty-fifth octets of the FIF of NSS signal and transmitted.

2. The apparatus according to claim 1, wherein the fourth octet of the FIF of NSS signal is not 0 when the Internet facsimile function is present, and is 0 when the Internet facsimile function is not present.

3. An Internet facsimile apparatus comprising:

a destination data storage unit arranged to store destination data containing at least a telephone number, presence/absence of an Internet facsimile function, and Internet address of each transmission destination;

a first transmitting/receiving unit arranged to transmit and receive an image by an Internet facsimile transmitting/receiving function;

a second transmitting/receiving unit arranged to transmit and receive an image by an ordinary facsimile transmitting/receiving function;

a first Internet function informing unit arranged to transmit an Internet facsimile function and an Internet address of said Internet facsimile apparatus while said second transmitting/receiving unit is performing ordinary facsimile transmission;

a selecting unit arranged to select the telephone number or the Internet address based on a manual instruction in a case where both of the telephone number and the Internet address are registered in said destination data storage unit;

a first Internet function detecting unit arranged to detect and register an Internet facsimile function and Internet address of a partner apparatus in corresponding destination data in said destination data storage unit while said second transmitting/receiving unit is performing ordinary facsimile reception;

a second Internet function informing unit arranged to transmit the Internet facsimile function and Internet address of said Internet facsimile apparatus while said second transmitting/receiving unit is performing ordinary facsimile reception; and a second Internet function detecting unit arranged to detect and register an Internet facsimile function and Internet address of a partner apparatus in corresponding destination data in said destination data storage unit while said second transmitting/receiving unit is performing ordinary facsimile transmission, wherein when transmission is performed for the partner apparatus, said first transmitting/receiving unit communicates with the partner apparatus by using the Internet address in the destination data in a case where said selecting unit selects the Internet address, while said second transmitting/receiving unit communicates with the partner apparatus by using the telephone number in the destination data in a case where said selecting unit selects the telephone number, the ordinary facsimile is a G3 facsimile, and said first Internet function informing unit or said first Internet function detecting unit transmits the Internet facsimile function and Internet address by using an FIFI of NSS signal in the standard protocol, and the Internet facsimile function is stored in a fourth octet of the FIF of NSS signal and transmitted, and the Internet address is stored in fifth to twenty-fifth octets of the FIF of NSS signal and transmitted.

4. The apparatus according to claim 3, wherein the fourth octet of the FIF of NSS signal is not 0 when the Internet facsimile function is present, and is 0 when the Internet facsimile function is not present.

5. An Internet facsimile apparatus comprising:

a destination data storage unit arranged to store destination data containing at least a telephone number, presence/absence of an Internet facsimile function, and Internet address of each transmission destination;

a first transmitting/receiving unit arranged to transmit and receive an image by an Internet facsimile transmitting/receiving function;

a second transmitting/receiving unit arranged to transmit and receive an image by an ordinary facsimile transmitting/receiving function;

a first Internet function detecting unit arranged to detect and register an Internet facsimile function and an Internet address of a partner apparatus in corresponding destination data in said destination data storage unit while said second transmitting/receiving unit is performing ordinary facsimile transmission;

a selecting unit arranged to select the telephone number or the Internet address based on a manual instruction in a case where both of the telephone number and the Internet address are registered in said destination data storage unit; and a first Internet function informing unit arranged to transmit an Internet facsimile function and Internet address of said Internet facsimile apparatus while said second transmitting/receiving unit is performing ordinary facsimile transmission, wherein when transmission is performed for the partner apparatus, said first transmitting/receiving unit communicates with said partner apparatus by using the Internet address in the destination data in a case where said selecting unit selects the Internet address, while said second transmitting/receiving unit communicates with the partner apparatus by using the telephone number in the destination data in a case where said selecting unit selects the telephone number, the ordinary facsimile is a G3 facsimile, and said first Internet function informing unit or said first Internet function detecting unit transmits the Internet facsimile function and Internet address by using an FIF of NSS signal in the standard protocol, and the Internet facsimile function is stored in a fourth octet of the FIF of NSS signal and transmitted, and the Internet address is stored in fifth to twenty-fifth octets of the FIF of NSS signal and transmitted.

6. The apparatus according to claim 5, wherein the fourth octet of the FIF of NSS signal is not 0 when the Internet facsimile function is present, and is 0 when the Internet facsimile function is not present.

7. An Internet facsimile apparatus comprising:

a destination data storage unit arranged to store destination data containing at least a telephone number, presence/absence of an Internet facsimile function, and Internet address of each transmission destination;

a first transmitting/receiving unit arranged to transmit and receive an image by an Internet facsimile transmitting/receiving function;

a second transmitting/receiving unit arranged to transmit and receive an image by an ordinary facsimile transmitting/receiving function;

a first Internet function detecting unit arranged to detect and register an Internet facsimile function and an Internet address of a partner apparatus in corresponding destination data in said destination data storage unit while said second transmitting/receiving unit is performing ordinary facsimile reception, a selecting unit arranged to select the telephone number or the Internet address based on a manual instruction in a case where both of the telephone number and the Internet address are registered in said destination data storage unit; and a first Internet function informing unit arranged to transmit an Internet facsimile function and Internet address of said Internet facsimile apparatus while said second transmitting/receiving unit is performing ordinary facsimile reception, wherein when transmission is performed for the partner apparatus, said first transmitting/receiving unit communicates with the partner apparatus by using the Internet address in the destination data in a case where said selecting unit selects the Internet address, while said second transmitting/receiving unit communicates with the partner apparatus by using the telephone number in the destination data in a case where said selecting unit selects the telephone number, the ordinary facsimile is a G3 facsimile, and said first Internet function informing unit or said first Internet function detecting unit transmits the Internet facsimile function and Internet address by using an FIF of NSS signal in the standard protocol, and the Internet facsimile function is stored in a fourth octet of the FIF of NSS signal and transmitted, and the Internet address is stored in fifth to twenty-fifth octets of the FIF of NSS signal and transmitted.

8. The apparatus according to claim 7, wherein the fourth octet of the FIF of NSS signal is not 0 when the Internet facsimile function is present, and is 0 when the Internet facsimile function is not present.

9. An Internet facsimile apparatus comprising:

a destination data storage unit arranged to store destination data containing at least a telephone number, presence/absence of an Internet facsimile function, and Internet address of each transmission destination;

a first transmitting/receiving unit arranged to transmit and receive an image by an Internet facsimile transmitting/receiving function;

a second transmitting/receiving unit arranged to transmit and receive an image by an ordinary facsimile transmitting/receiving function;

a first Internet function detecting unit arranged to detect and register an Internet facsimile function and Internet address of a partner apparatus in corresponding destination data in said destination data storage unit while said second transmitting/receiving unit is performing ordinary facsimile reception;

a selecting unit arranged to select the telephone number or the Internet address based on a manual instruction in a case where both of the telephone number and the Internet address are registered in said destination data storage unit; and wherein when transmission is performed for the partner apparatus, said first transmitting/receiving unit communicates with the partner apparatus by using the Internet address in the destination data in a case where said selecting unit selects the Internet address, while said second transmitting/receiving unit communicates with the partner apparatus by using the telephone number in the destination data in a case where said selecting unit selects the telephone number, the ordinary facsimile is a G3 facsimile, and said first Internet function detecting unit transmits the Internet facsimile function and Internet address by using an FIF of NSS signal in the standard protocol, and the Internet facsimile function is stored in a fourth octet of the FIF of NSS signal and transmitted, and the Internet address is stored in fifth to twenty-fifth octets of the FIF of NSS signal and transmitted.

10. The apparatus according to claim 9, wherein the fourth octet of the FIF of NSS signal is not 0 when the Internet facsimile function is present, and is 0 when the Internet facsimile function is not present.

* * * * *

UNITED STATES PATENT AND TRADEMARK OFFICE
CERTIFICATE OF CORRECTION

PATENT NO. : 6,690,480 B2
DATED : February 10, 2004
INVENTOR(S) : Toru Maeda

It is certified that error appears in the above-identified patent and that said Letters Patent is hereby corrected as shown below:

Title page,
Item [*] Notice, insert -- This patent issued on a continued prosecution application filed under 37 CFR 1.53(d), and is subject to the twenty year patent term provisions of 35 U.S.C. 154(a)(2). --.

Item [56], References Cited, U.S. PATENT DOCUMENTS, insert:

| -- | 6,104,505 | 08-2000 | Malik |
| | 6,097,797 | 08-2000 | Osteo |
| | 6,005,677 | 12-1999 | Suzuki |
| | 6,230,189 | 05-2001 | Sato et al. |
| | 4,999,716 | 03-1991 | Nakamura --. |

Column 15,
Line 26, "NSF." should read -- NSF. The apparatus stores its Internet address in the fifth and subsequent octets. --.

Column 16,
Line 54, "address are" should read -- address is --.

Column 18,
Line 60, "5174," should read -- S174, --.

Column 19,
Line 1, "5175," should read -- S175, --;
Line 3, "5176," should read -- S176, --; and
Line 40, "5100." should read -- S100. --.

Signed and Sealed this

Third Day of August, 2004

JON W. DUDAS
*Acting Director of the United States Patent and Trademark Office*